US 11,893,060 B2

(12) United States Patent
Grail et al.

(10) Patent No.: US 11,893,060 B2
(45) Date of Patent: Feb. 6, 2024

(54) LATENT QUESTION REFORMULATION AND INFORMATION ACCUMULATION FOR MULTI-HOP MACHINE READING

(71) Applicant: NAVER CORPORATION, Gyeonggi-do (KR)

(72) Inventors: Quentin Grail, Meylan (FR); Julien Perez, Grenoble (FR); Eric Jacques Guy Gaussier, Grenoble (FR)

(73) Assignee: NAVER CORPORATION, Gyeonggi-do (KR)

( * ) Notice: Subject to any disclaimer, the term of this patent is extended or adjusted under 35 U.S.C. 154(b) by 511 days.

(21) Appl. No.: 17/015,501

(22) Filed: Sep. 9, 2020

(65) Prior Publication Data

US 2021/0256069 A1 Aug. 19, 2021

Related U.S. Application Data

(60) Provisional application No. 62/971,100, filed on Feb. 6, 2020.

(51) Int. Cl.
*G06F 16/9032* (2019.01)
*G06F 3/16* (2006.01)
(Continued)

(52) U.S. Cl.
CPC .......... *G06F 16/90332* (2019.01); *G06F 3/16* (2013.01); *G06F 16/3325* (2019.01);
(Continued)

(58) Field of Classification Search
CPC .. G06F 16/90332; G06F 3/16; G06F 16/3325; G06F 16/3329; G06F 16/3346;
(Continued)

(56) References Cited

U.S. PATENT DOCUMENTS 10,496,705 B1 * 12/2019 Irani ....................... H04L 51/18
11,132,994 B1 * 9/2021 Zhou ....................... G06F 40/30
(Continued)

OTHER PUBLICATIONS

Cho et al., "Learning phrase representations using RNN encoder-decoder for statistical machine translation", in Proceedings of the 2014 Conference on Empirical Methods in Natural Language Processing, EMNLP, 2014.
(Continued)

*Primary Examiner* — Edwin S Leland, III

(57) ABSTRACT

A question answering system includes: a first encoder module configured to receive a question, the question including a first plurality of words, and encode the question into a first vector representation; a second encoder module configured to encode a document into a second vector representation, the document including a second plurality of words; a first reading module configured to generate a third vector representation based on the first and second vector representations; a first reformulation module configured to generate a first reformulated vector representation based on the first vector representation; a second reading module configured to generate a fifth vector representation based on the second vector representation and the first reformulated vector representation; a second reformulation module configured to generate a second reformulated vector representation based on first reformulated vector representation; and an answer module configured to determine an answer to the question based on the second reformulated vector representation.

20 Claims, 14 Drawing Sheets

(51) Int. Cl.

| | |
|---|---|
| *G06F 16/332* | (2019.01) |
| *G06F 16/33* | (2019.01) |
| *G06F 40/253* | (2020.01) |
| *G06F 40/279* | (2020.01) |
| *G06F 40/289* | (2020.01) |
| *G06F 40/30* | (2020.01) |
| *G06F 40/44* | (2020.01) |
| *G06F 40/47* | (2020.01) |
| *G06F 40/56* | (2020.01) |
| *G06N 3/04* | (2023.01) |
| *G06N 3/08* | (2023.01) |
| *G10L 15/06* | (2013.01) |
| *G10L 15/16* | (2006.01) |

(52) U.S. Cl.
CPC ...... *G06F 16/3329* (2019.01); *G06F 16/3346* (2019.01); *G06F 16/3347* (2019.01); *G06F 40/253* (2020.01); *G06F 40/279* (2020.01); *G06F 40/289* (2020.01); *G06F 40/30* (2020.01); *G06F 40/44* (2020.01); *G06F 40/47* (2020.01); *G06F 40/56* (2020.01); *G06N 3/04* (2013.01); *G06N 3/08* (2013.01); *G10L 15/063* (2013.01); *G10L 15/16* (2013.01)

(58) Field of Classification Search
CPC .. G06F 16/3347; G06F 40/253; G06F 40/279; G06F 40/289; G06F 40/30; G06F 40/44; G06F 40/47; G06F 40/56; G06N 3/04; G06N 3/08; G10L 15/063; G10L 15/16
USPC ...................................................... 704/270.1
See application file for complete search history.

(56) References Cited

U.S. PATENT DOCUMENTS

| | | | | |
|---|---|---|---|---|
| 11,170,287 | B2* | 11/2021 | Zhong | G06F 16/93 |
| 11,227,218 | B2* | 1/2022 | Min | G06F 40/20 |
| 11,271,876 | B2* | 3/2022 | Yoon | G06F 16/903 |
| 11,366,969 | B2* | 6/2022 | Rajani | G06N 3/045 |
| 11,442,992 | B1* | 9/2022 | Moon | G06N 20/00 |
| 11,461,613 | B2* | 10/2022 | Perez | G06N 3/047 |
| 11,501,080 | B2* | 11/2022 | D'Souza | G06N 5/022 |
| 2018/0150743 | A1* | 5/2018 | Ma | G06N 3/084 |
| 2018/0261214 | A1* | 9/2018 | Gehring | G06N 3/04 |
| 2019/0087721 | A1* | 3/2019 | Prakash | G06N 3/08 |
| 2019/0332917 | A1* | 10/2019 | Qian | G06N 3/088 |
| 2020/0104726 | A1* | 4/2020 | Alvelda, VII | G06N 5/04 |
| 2020/0105272 | A1* | 4/2020 | Wu | G06F 16/3347 |
| 2020/0134449 | A1* | 4/2020 | Perez | G06F 40/205 |
| 2020/0142997 | A1* | 5/2020 | Kondadadi | G06F 16/3329 |
| 2020/0175015 | A1* | 6/2020 | Al Hasan | G06F 16/355 |
| 2020/0242444 | A1* | 7/2020 | Zhang | G06F 16/367 |
| 2020/0251100 | A1* | 8/2020 | Tan | G06F 40/30 |
| 2020/0379726 | A1* | 12/2020 | Blatz | G06F 3/167 |
| 2020/0410012 | A1* | 12/2020 | Moon | G06Q 10/04 |
| 2021/0081503 | A1* | 3/2021 | Tran | G06K 9/6215 |
| 2021/0089594 | A1* | 3/2021 | Xiong | G06N 5/022 |
| 2021/0169442 | A1* | 6/2021 | Agarwal | A61B 5/7264 |
| 2021/0224332 | A1* | 7/2021 | Shekhar | G06N 3/08 |
| 2021/0256069 | A1* | 8/2021 | Grail | G06N 3/04 |
| 2021/0391080 | A1* | 12/2021 | Fan | G06F 40/295 |

OTHER PUBLICATIONS

Clark and Gardner, "Simple and effective multi-paragraph reading comprehension", Proceedings of the 56th Annual Meeting of the Association for Computational Linguistics, ACL, Melbourne, 2018.

Devlin et al., "BERT: pre-training of deep bidirectional transformers for language understanding", in Computing Research Repository, CoRR, abs/1810.04805, 2018.

Pennington et al., "Glove: Global vectors for word representation", in Empirical Methods in Natural Language Processing, EMNLP, 2014.

Seo et al., "Bidirectional attention flow for machine comprehension", in CORR, abs/1611.01603, 2016.

Sugawara et al., "What makes reading comprehension easier?" in Proceedings of the 2018 Conference on Empirical Methods in Natural Language Processing, EMNLP, Brussels, Oct. 31-Nov. 4, 2018.

Wang et al., "Gated self-matching networks for reading comprehension and question answering", Proceedings of the 55th Annual Meeting of the Association for Computational Linguistics, ACL, Vancouver, 2017.

Welbl et al., "Constructing Datasets for Multi-Hop Reading Comprehension Across Documents", Transactions of the Association for Computational Linguistics, TACL, 2018.

Yang et al. "HotpotQA: A dataset for diverse, explainable multi-hop question answering", Proceedings of the Conference on Empirical Methods in Natural Language Processing, EMNLP, 2018.

Yu et al., "Fast and accurate reading comprehension by combining self-attention and convolution", International Conference on Learning Representations, 2018.

Grail Quentin: "Latent Question Reformulation and Information Accumulation for Multi-Hop Machine Reading", XP055819663, Sep. 25, 2019.

Adams Wei Yu, David Dohan, Quoc Le, Thang Luong, Rui Zhao, and Kai Chen. 2018. Fast and accurate reading comprehension by combining self-attention and convolution. In International Conference on Learning Representations.

Danqi Chen, Adam Fisch, Jason Weston, and Antoine Bordes. 2017. Reading wikipedia to answer open domain questions. In Proceedings of the 55th Annual Meeting of the Association for Computational Linguistics, ACL 2017, Vancouver, Canada, Jul. 30-Aug. 4, vol. 1: Long Papers, pp. 1870-1879.

Matt Gardner and Christopher Clark. 2018. Simple and effective multi-paragraph reading comprehension. In Proceedings of the 56th Annual Meeting of the Association for Computational Linguistics, ACL 2018, Melbourne, Australia, Jul. 15-20, 2018, vol. 1: Long Papers, pp. 845-855.

Min Joon Seo, Aniruddha Kembhavi, Ali Farhadi, and Hannaneh Hajishirzi. 2016. Bidirectional attention flow for machine comprehension. CoRR, abs/1611.01603.

Nal Kalchbrenner, Edward Grefenstette, and Phil Blunsom. 2014. A convolutional neural network for modelling sentences. In Proceedings of the 52nd Annual Meeting of the Association for Computational Linguistics, ACL 2014, Jun. 22-27, 2014, Baltimore, MD, USA, vol. 1: Long Papers, pp. 655-665.

Wei Wang, Chen Wu, and Ming Yan. 2018. Multigranularity hierarchical attention fusion networks for reading comprehension and question answering. In Proceedings of the 56th Annual Meeting of the Association for Computational Linguistics, ACL 2018, Melbourne, Australia, Jul. 15-20, 2018, vol. 1: Long Papers, pp. 1705-1714.

* cited by examiner

P1: Lit (band)
Lit is an American rock band, formed in 1995 in Fullerton, California.

P2: Adorable (band)
Adorable was an alternative rock band, formed in Coventry in 1990.

Q: Which band was formed first, Lit or Adorable? A: Adorable

P1: Apratim Majumdar
Apratim Majumdar (born 1978), is an Indian classical musician from Kolkata, India. He plays the Sarod.

P2: Sarod
The sarod is a stringed instrument of India, used mainly in Indian classical music.

Q: What class of instrument does Apatim Majumdar play? A: stringed instrument

FIG. 4

Question: What award did the writer of Never Let Me Go novel win in 1989?
Answer: Man Booker Prize for Fiction
Predicted answer: Man Booker Prize for Fiction

**** Before Reformulation ****

Never Let Me Go (novel)
Never Let Me Go is a 2005 dystopian science fiction novel by Japanese-born British author Kazuo Ishiguro. It was shortlisted for the 2005 Booker Prize (an award Ishiguro had previously won in 1989 for "The Remains of the Day") for the 2006 Arthur C. Clarke Award and for the 2005 National Book Critics Circle Award.

The Remains of the Day
The Remains of the Day is a 1989 novel by British writer Kazuo Ishiguro.
The work was awarded the Man Booker Prize for Fiction in 1989.

**** After Reformulation ****

Never Let Me Go (novel)
Never Let Me Go is a 2005 dystopian science fiction novel by Japanese-born British author Kazuo Ishiguro. It was shortlisted for the 2005 Booker Prize (an award Ishiguro had previously won in 1989 for "The Remains of the Day") for the 2006 Arthur C. Clarke Award and for the 2005 National Book Critics Circle Award.

The Remains of the Day
The Remains of the Day is a 1989 novel by British writer Kazuo Ishiguro.
The work was awarded the ▓▓▓ ▓▓▓▓▓ Fiction in 1989.

FIG. 9

Question: What is the population according to the 2007 population census of the city in which the National Archives and Library of Ethiopia is located?
Answer: 3,384,569
Predicted answer: 3,384,569

***** Before Reformulation *****

Addis Ababa
It has a population of 3,384,569 according to the 2007 population census, with annual growth rate of 3.8%.

National Archives and Library of Ethiopia
The National Archives and Library of Ethiopia, located in Addis Ababa, is the national library and archives of the country.

***** After Reformulation *****

Addis Ababa
It has a population of 3,384,569 according to the 2007 population census, with annual growth rate of 3.8%.

National Archives and Library of Ethiopia
The National Archives and Library of Ethiopia, located in Addis Ababa, is the national library and archives of the country.

FIG. 10

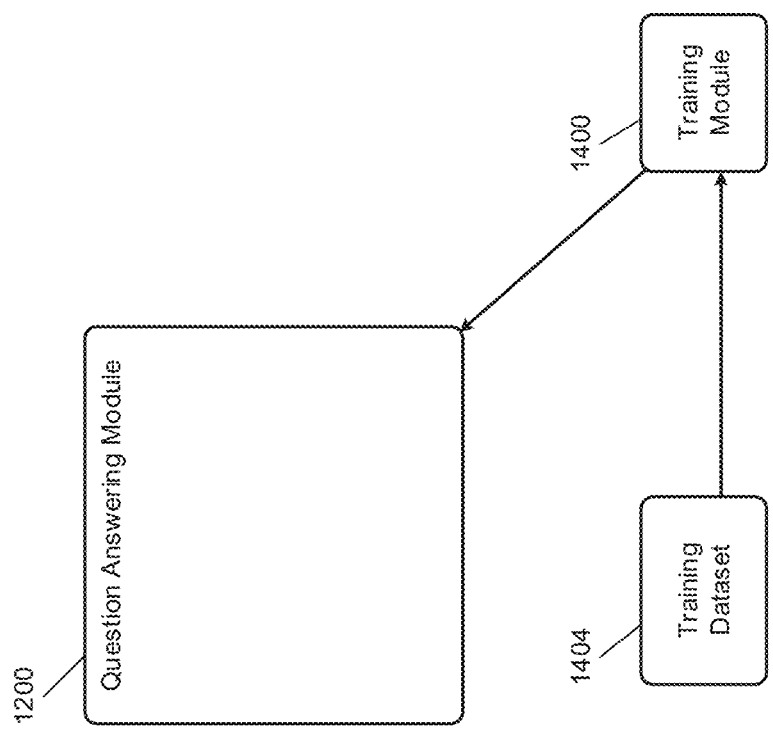

LATENT QUESTION REFORMULATION AND INFORMATION ACCUMULATION FOR MULTI-HOP MACHINE READING

CROSS-REFERENCE TO RELATED APPLICATIONS

This application claims the benefit of U.S. Provisional Application No. 62/971,100, filed on Feb. 6, 2020. The entire disclosure of the application referenced above is incorporated herein by reference.

FIELD

The present disclosure relates to question answering systems and methods, and more particularly to multi-hop question answering using neural networks, attention mechanisms, and bidirectional gated recurrent units.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The emergence of large-scale datasets such as CNN/Daily Mail, SQuAD, and MSMARCO have encouraged the development of machine reading models, which may outperform human readers performance. Apart from that, the widespread use of speech assistants makes the question-answering task relevant for real-life applications. Unlike screen-based search engines, speech assistants are used to answer user questions based on data retrieved from the Internet.

The ability to extract relevant information automatically from large corpora is challenging. The task of question-answering may be used as a proxy task to evaluate the reading comprehension capabilities of neural architectures. Question answering may be based on single-hop extractive machine reading. This may involve the ability to read and extract information from a single piece of text, which may include a few sentences.

The task of single-hop extractive machine reading can be described as follows: given a document and an associated question, extract a span of the document that answers the question. This may involve a machine reading model extracting two probability distributions. The first probability distribution may represent the probability of each word of the document being the starting word of the span that answers the question. The second probability distribution may represent the probability of each word of the document being the ending word of the span that answers the question. The prediction regarding which span of the document answers the question is then made by identifying the span that maximizes these probabilities without breaking specific rules. Examples of rules include (a) the span starting word needs to be before the ending one and (b) the span should not be longer than a predetermined length (e.g., a predetermined number of words).

This may achieve a relatively high accuracy for easy questions that can be answered where a similarity between the question and the sentences of the document exist. Models may aim to detect patterns and named entities but lack reasoning capabilities.

SUMMARY

The present disclosure provides an improved method and system for multi-hop question answering.

In a feature, a system architecture is provided that allows a single-hop reader to sequentially read into a concatenated set of documents in order to aggregate and reformulate information to produce an answer. To handle this sequential reasoning capability, in a feature, a new two-dimensional and fixed sized latent representation of the question is formulated. In the answering process, the representation of the question is updated using an attention mechanism that correlates the information of the document and a reformulation of the question in the latent space, also called a controller.

In a feature, a machine reading architecture, including multiple stacked reading blocks, that sequentially collect (i.e., accumulate) information across a document and update their controllers is defined. In some embodiments, an adaptive max-pooling layer that compacts information from a variable length text sequence into a fixed size matrix is provided. In a feature, an extractive reading-based attention mechanism that computes the attention vector from the output layer of an extractive machine-reading model is provided.

In a feature, a neural-network based machine-reading system that answers a question based on a document is provided. The system includes: an input module configured to receive a question Q including a first plurality of words; a first encoder configured to encode the question Q to a token representation $E^Q$ and a second encoder configured to encode a document D including a second plurality of words to a token representation $E^D$. Each of the first and second encoders use one of a word-level embedding, a character-level embedding, and a concatenation of a word-level embedding and a character-level embedding. A number T of reading blocks are provided, T being an integer greater than one, the T reading blocks being configured to transform iteratively the encoded question $E^Q$ using the encoded document $E^D$, where the first reading block is configured to receive as input the encoded document $E^D$ and the encoded question $E^Q$ and to output a transformed question $U^1$, and each subsequent reading block t, t being an integer between two and T, is configured to receive as input the encoded document $E^D$ and the output $U^{t-1}$ of the preceding reading block and to output a transformed question $U^t$. An answer module is configured to receive as input $E^D$ and the output $U^T$ of the final reading block and to produce as output an answer to Q.

In a feature, each reading block t of the system includes a reader configured to compute and output two sets of probabilities $P^t_{start}$ and $P^t_{end}$ that represent the probability of each word of the document to be the beginning of an answer span and the probability of each word of the document to be the end of the answer span, respectively, the answer span being a span of words of the document D that answers the question Q.

In a feature, each reading block t of the system further includes an extractive attention module configured to compute, based on $P^t_{start}$ and $P^t_{end}$, an attention $A^t$ being a vector of probability values giving the probability for each given token in $E^D$ that the given token is part of the answer span.

In a feature, each reading block t of the system further includes a controller update module configured to weight each token in $E^D$ with the corresponding probability value of $A^t$ to obtain a weighted $E^D$ and to update $U^{t-1}$ to $U^t$ based on $U^{t-1}$ and on the weighted $E^D$.

In a feature, the system further includes an adaptive max-pooling layer configured to transform $E^Q$ to a representation having a fixed number of tokens before $E^Q$ is fed into the first reading block, and another adaptive max-pooling layer within the controller update module of each reading block t configured to transform the weighted $E^D$ to a representation having the same fixed number of tokens as the representation of $E^Q$.

In a feature, the controller update module of each reading block t of the system is configured to update $U^{t-1}$ to $U^t$ by applying a bidirectional gated recurrent unit (BiGRU) to a concatenation of the weighted tokens of $E^D$ and corresponding tokens of $U^{t-1}$.

In a feature, the second encoder of the system is configured to compute $E^D$ based on the concatenation of the word-level and the character-level embeddings by applying a BiGRU to the concatenation of the word-level and character-level encodings.

In a feature, the answer module of the system is further configured to compute values of the two sets of probabilities $P^T_{start}$ and $P^T_{end}$ and further includes a three-way classifier configured to produce the probabilities of "yes", "no" and span-based answers.

According to another aspect of the system, the produced answer is the answer having the highest probability among the "yes" answer, the "no" answer, and the span-based answer made of the span beginning at the word of the document having the highest $P^T_{start}$ and ending at the word of the document having the highest $P^T_{end}$.

In a feature, each reader t of the T readers and the answer module are all configured to compute a bi-attention between the representation of the document $E^D$ and the transformed question $U^{t-1}$ for each reader t or the transformed question $U^T$ for the answer module, and to compute a self-attention of the document, and where the outputs $P^t_{start}$ and $P^t_{end}$ of each reader t and the answer output by the answer module are based on the corresponding bi-attention and the corresponding self-attention computed by the reader t and the answer module, respectively.

In a feature, the bi-attention and the self-attention are based on a similarity matrix given by:

$$S_{i,j} = W_1 e^D_{:,i} + W_2 u^{t-1}_{:,j} + W_3(e^D_{:,i} \odot u^{t-1}_{:,j}),$$

where $W_1$, $W_2$ and $W_3$ are trainable matrices, $e^D_{:,i}$ and $u^{t-1}_{:,j}$ are vectors each encoding a single token of $E^D$ and of the transformed question $U^{t-1}$, respectively, and wherein the operator $\odot$ defines element-wise multiplication.

In a feature, the received question, which may be received from a user, and/or the output answer, which may be presented to the user, are speech-based, and/or the document and the question relate to a diagnosis of a technical or medical problem, and/or the answer triggers automatically a robotic action.

In a feature, a method for answering a question based on a document is provided. The method includes: receiving a question Q including a first plurality of words from a user; encoding the question Q to a token representation $E^Q$ and a document D including a second plurality of words to a token representation $E^D$ using one of a word-level embedding, a character-level embedding, and a concatenation of a word-level embedding and a character-level embedding; transforming iteratively, by a series of T reading blocks, $E^Q$ using $E^D$, where the first reading block receives as input the encoded document $E^D$ and the encoded question $E^Q$ and outputs a transformed question $U^1$, and each subsequent reading block t, t being an integer between two and T, receives as input the encoded document $E^D$ and the output $U^{t-1}$ of the preceding reading block and outputs a transformed question $U^t$; producing an answer to Q from $E^D$ and the output $U^T$ of the final reading block; and outputting the answer to the user.

In a feature, the method further includes transforming, by an adaptive max-pooling layer, $E^Q$ to a representation having a fixed number of tokens before $E^Q$ is fed into the first reading block, and another adaptive max-pooling layer within the controller update module of each reading block t configured to transform the weighted $E^D$ to a representation having the same fixed number of tokens as the representation of $E^Q$.

In a feature, transforming iteratively includes, for each reading block t: computing and outputting two sets of probabilities $P^t_{start}$ and $P^t_{end}$ that represent the probability of each word of the document to be the beginning of an answer span and the probability of each word of the document to be the end of the answer span, respectively, the answer span being a span of words of the document D that answers the question Q; computing, based on $P^t_{start}$ and $P^t_{end}$, an attention $A^t$ being a vector of probability values giving the probability for each given token in $E^D$ that the given token is part of the answer span; weighting each token in $E^D$ with the corresponding probability value of $A^t$ to obtain a weighted $E^D$; and updating $U^{t-1}$ to $U^t$ based on $U^{t-1}$ and on the weighted $E^D$.

In a feature, a question answering system includes: a first encoder module configured to receive a question from a computing device via a network, the question including a first plurality of words, and to encode the question into a first vector representation; a second encoder module configured to encode a document D into a second vector representation, the document including a second plurality of words; a first reading module configured to generate a third vector representation based on the first and second vector representations; a first reformulation module configured to generate a first reformulated vector representation for the question based on the first vector representation; a second reading module configured to generate a fifth vector representation based on the second vector representation and the first reformulated vector representation; a second reformulation module configured to generate a second reformulated vector representation for the question based on first reformulated vector representation; and an answer module configured to determine an answer to the question based on the second reformulated vector representation and to transmit the answer to the computing device via the network.

In further features, each of the first and second encoder modules is configured to execute one of word-level encoding, character-level encoding, and both word-level embedding and character-level encoding.

In further features, the first reformulation module is configured to generate the first reformulated vector representation further based on the second vector representation.

In further features, the second reformulation module is configured to generate the second reformulated vector representation further based on the second vector representation.

In further features, the answer module is configured to generate the answer further based on the second vector representation.

In further features, a max pooling module is configured to adjust a dimension of the first vector representation to a predetermined dimension.

In further features, a third reading module is configured to generate a fifth vector representation based on the second vector representation and the second reformulated vector representation; a third reformulation module is configured to generate a third reformulated vector representation for the question based on second reformulated vector representation, where the answer module is configured to determine the answer to the question based on the third reformulated vector representation.

In further features, the first reading module is configured to determine (a) first and (b) second sets of probabilities that represent (a) a probability of each word of the document being a beginning of an answer span and (b) a probability of each word of the document being an end of the answer span, respectively, the answer span being a span of words of the document that correctly answers the question.

In further features, an extractive attention module is configured to, based on the first and second sets of probabilities, determine an attention vector of probabilities of entries of the second vector representation being part of the answer span.

In further features, the first reformulation module is configured to generate a weighted second vector representation by applying weighting entries of the second vector representation based on values in the attention vector and to determine the first reformulated vector representation based on the weighted second vector representation.

In further features, a max pooling module configured to adjust a dimension of the first vector representation to a predetermined dimension, where the first reformulation module is configured to adjust a dimension of the weighted second vector representation to the predetermined dimension.

In further features, the first reformulation module includes a bidirectional gated recurrent unit (BiGRU) and the second reformulation module includes a BiGRU.

In further features, the second encoder module is configured to generate the second vector representation based on a concatenation of word level encoding and character level encoding.

In further features, the answer module is further configured to determine a first probability of the answer being yes, a second probability of the answer being no, and a third probability of the answer being a span of the words of the second plurality of words of the document.

In further features, the answer module is configured to: set the answer to yes when the first probability is greater than the second and third probabilities; set the answer to no when the second probability is greater than the first and third probabilities; and set the answer to the span of words when the third probability is greater than the first and second probabilities.

In further features, the computing device is configured to at least one of: display the answer on a display; and output the answer via at least one speaker.

In further features, the computing device is configured to receive the question via a microphone.

In further features, the answer module includes four bidirectional gated recurrent units and four fully connected layers.

In further features, a training system includes: the question answering system; and a training module configured to train the question answering system by minimizing a first loss regarding facts support answers to questions, a second loss regarding spans of words, and a third loss regarding classification of answers.

In a feature, a question answering system includes: a means for receiving a question from a computing device via a network, the question including a first plurality of words, and to encode the question into a first vector representation; a means for encoding a document D into a second vector representation, the document including a second plurality of words; a means for generating a third vector representation based on the first and second vector representations; a means for generating a first reformulated vector representation for the question based on the first vector representation; a means for generating a fifth vector representation based on the second vector representation and the first reformulated vector representation; a means for generating a second reformulated vector representation for the question based on first reformulated vector representation; and a means for determining an answer to the question based on the second reformulated vector representation and transmitting the answer to the computing device via the network.

In a feature, a question answering method includes: by one or more processors, receiving a question from a computing device via a network, the question including a first plurality of words, and to encode the question into a first vector representation; by the one or more processors, encoding a document D into a second vector representation, the document including a second plurality of words; by the one or more processors, generating a third vector representation based on the first and second vector representations; by the one or more processors, generating a first reformulated vector representation for the question based on the first vector representation; by the one or more processors, generating a fifth vector representation based on the second vector representation and the first reformulated vector representation; by the one or more processors, generating a second reformulated vector representation for the question based on first reformulated vector representation; by the one or more processors, determining an answer to the question based on the second reformulated vector representation; and by the one or more processors, transmitting the answer to the computing device via the network.

In a feature, a system for answering a question using a document includes: (A) a plurality of components of sequential hops, wherein a first component hop is coupled in sequence with a second component hop, and where: (a) the first component hop comprises a first reading module coupled to a first reformulation module, (i) the first reading module configured to receive the question and the document and to output to the first reformulation module a first question-aware representation of the document; and (ii) the first reformation module configured to extract elements from the first question-aware representation of the document and to compute a first updated representation of the question; and (b) the second component hop comprises a second reading module coupled to a second reformulation module, (i) the second reading module configured to receive the first updated representation of the question and the document and to output to the second reformulation module a second question-aware representation of the document; and (ii) the second reformulation module configured to extract elements from the second question-aware representation of the document and to compute a second updated representation of the question; (B) a plurality of parallel heads, each of the plurality of parallel heads including an independent instance of (A) the plurality of components of sequential hops; and (C) an answering module configured to: receive updated representations of the document output by the plurality of parallel heads, respectively; and based on the updated representations of the document, determine an answer to the question and facts in the document that support the answer to the question.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments. Further features and advantages will become apparent from the following and more particularly from the description of the embodiments, as illustrated in the accompanying drawings, wherein:

FIG. 4 includes two examples of multiple hop question answering given questions (Q) and answers (A);

FIGS. 9 and 10 include example questions, answers, and portions of documents before and after reformulation;

FIG. 14 is a functional block diagram of an example training system.

In the drawings, reference numbers may be reused to identify similar and/or identical elements.

DETAILED DESCRIPTION

There is a need for multi-hop reasoning. Multi-hop reasoning is desirable for answering questions in real-world situations, for example, in personal assistants or search engines, which may include speech-driven systems (e.g., "get me a movie by the director of 'Lord of the Rings'"), or for analysis of technical or medical problems. Multi-hop reasoning may involve gathering and reasoning over different pieces of evidence spread across multiple paragraphs.

The present application involves systems and methods for answering a question based on a document. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative embodiments will be described with reference to the drawings wherein like elements and structures are indicated by like reference numbers.

The present disclosure involves multi-hop reasoning tasks. In multi-hop tasks, each question may require that information is gathered and integrated (accumulated) from several paragraphs to be answered. The disclosed system is tested on a dataset named HotpotQA. The natural language questions of this corpus (dataset) have been designed to require reading at least two Wikipedia paragraphs to be answerable. There are two types of questions: extractive questions, where the answer is a span of text of an English Wikipedia paragraph, and binary yes/no questions. In addition to the answer, sentences are predicted that have been used to produce the correct answer, which are called supporting facts.

Tests of the disclosed system and method may be performed on a setting called a distractor setting, where each question comes with ten related paragraphs, including the two gold paragraphs. The gold paragraphs may be paragraphs required to answer the question. However, the disclosed system and method may also be used on the fullwiki benchmark setting and other settings. The fullwiki benchmark setting evaluates the capability of a model to answer a given question from the entire English Wikipedia dump, when combined with a suitable retriever.

Figure 1:
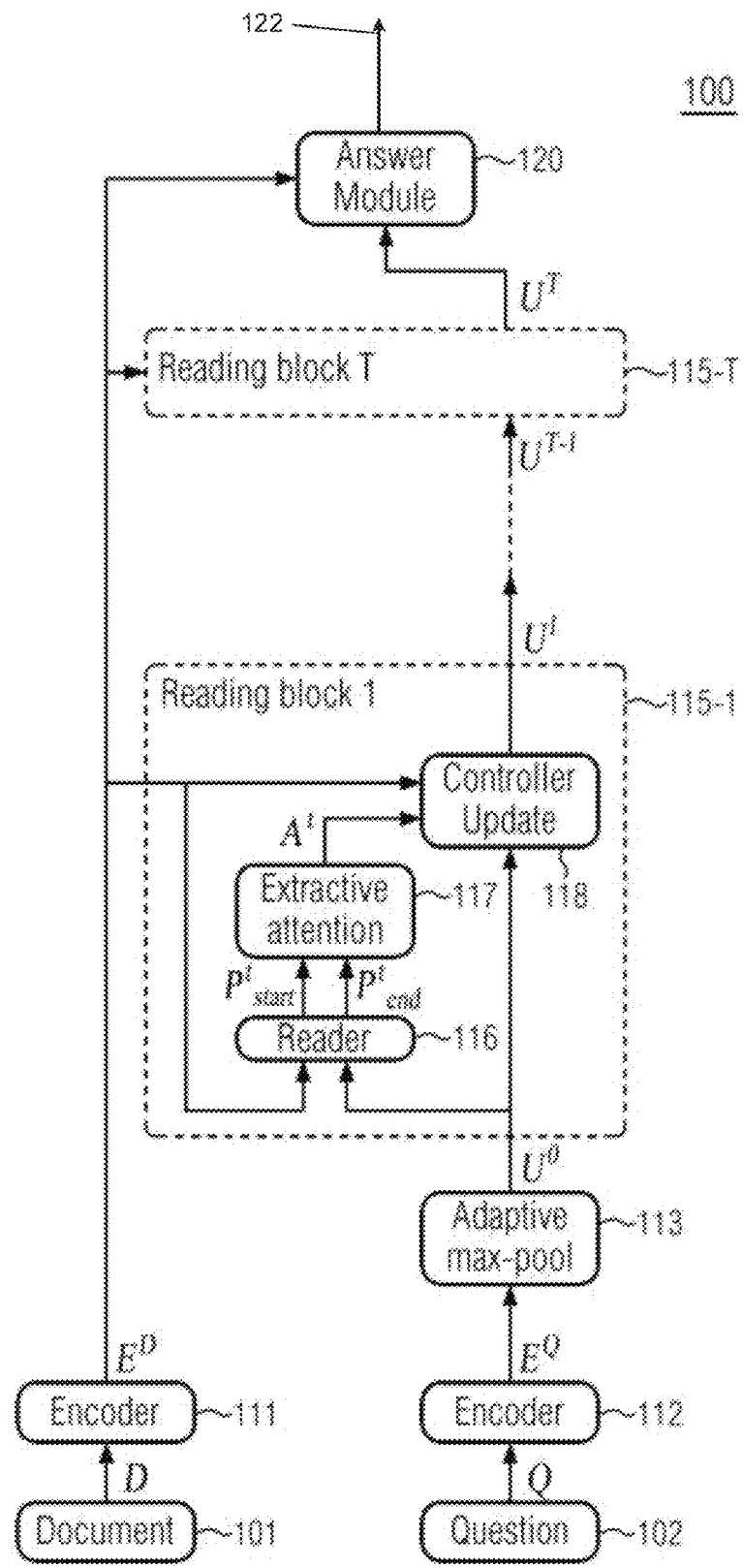
FIG. 1 is a block diagram illustrating a neural-network based machine-reading system for answering a question based on a document.

FIG. 1 shows an example machine reading architecture. The architecture includes a number T of stacked reading blocks 115-1, . . . , 115-T and an answer module 120 that aims to predict and output the final answer 122 (being "yes", "no", or an answer span of the document) along with the supporting facts. Each reading block encompasses (includes) a reading step performed through (by) a reader 116, the computation of an attention in an extractive attention module 117, and an update of a controller in a controller update module 118. At each reading block t, a given document D 101 is read sequentially and it is looked for evidence regarding the current state of a controller $U^t$, where $t \in [1, 7]$. This approach can be seen as a sequential reformulation of the question in a latent space regarding the relevant pieces of information collected (i.e., accumulated) across the document.

Describing the architecture illustrated in FIG. 1 in more detail, a question Q 102 may be received from a user via an input module. The question Q 102 may be received from a computing device, such as a cellular phone, a tablet device, a laptop computer, a desktop computer, a home assistant device, or another suitable type of computing device having a transceiver. The document D 101 relevant for the question may be retrieved from Wikipedia or another suitable database via a retriever (such as a search engine) or may be provided to the reading architecture in another manner.

The sequence of N words of the question Q 102 and the sequence of L words of the document D 101 may be defined by $D=\{w_i^D\}_{i=1}^{N}$ and $Q=\{w_i^Q\}_{i=1}^{L}$ Encoding Layer An encoder may first embed each word of D and Q into a token x of an embedding space of dimension d via a lookup table $$(\{x_i^D\}_{i=1}^{N}, \{x_i^Q\}_{i=1}^{L}).$$

In various implementations, the encoder may be replaced by two encoders 111 and 112.

Optionally, the encoder(s) perform a character-level encoding of each token with a 1D convolutional layer to produce a character embedding of each token. The encoder(s) may further optionally perform a max-pooling operation on the character embeddings to obtain $$(\{c_i^D\}_{i=1}^N, \{c_i^Q\}_{i=1}^L).$$

Optionally, the encoder(s) concatenate the word-level and character level embeddings of each token $$(\{x_i^D\}_{i=1}^N, \{x_i^Q\}_{i=1}^L)$$

and $$(\{c_i^D\}_{i=1}^N, \{c_i^Q\}_{i=1}^L),$$

and the concatenated result is fed into a Bidirectional Gated Recurrent Unit (BiGRU) as described in Cho et al., "Learning phrase representations using RNN encoder-decoder for statistical machine translation", in Proceedings of the 2014 Conference on Empirical Methods in Natural Language Processing, EMNLP, 2014, which is herewith incorporated by reference in its entirety, to obtain the input matrices $$(\{e_i^D\}_{i=1}^N, \{e_i^Q\}_{i=1}^L)$$

defined by:

$$e_i^Q = BiGRU(e_{i-1}^Q, [x_i^Q; c_i^Q])$$
$$e_i^D = BiGRU(e_{i-1}^D, [x_i^D; c_i^D]).$$

A BiGRU layer receives a pair (including an input sequence and an output sequence) as input and includes two recurrent neural networks (RNNs) The BiGRU may also include an encoder RNN and a decoder RNN. The first RNN encoding the input sequence of symbols into a fixed-length vector representation (i.e. the final hidden state of the encoder RNN), and the second RNN decoding the fixed-length vector representation back into a variable length sequence. The encoder RNN reads each symbol of the input sequentially and changes its hidden state by applying to its previous hidden state a non-linear activation function taking into account the read symbol. By using a non-linear activation function that includes an update gate (deciding whether the hidden state is to be updated, if at all) and a reset gate (deciding whether the previous gate is ignored), the final hidden state of the encoder RNN obtained at the end of the process (i.e., once the whole input sequence of symbols has been read) is a summary of the whole input sequence of symbols. The decoder RNN is trained to generate an output sequence by predicting a next symbol of the output sequence given the current symbol and the current hidden state of the decoder RNN, which is initialized with the final hidden state obtained through the encoder RNN. The whole BiGRU layer generates a score for a given pair of input and output sequences, where the score is the probability of obtaining the output sequence given the input sequence. Cho et al., 2014, provides additional details regarding the role and architecture of the BiGRU layer.

Adaptive Max-Pooling Layer

An adaptive max-pooling layer (adaptive max-pool) 113 may be used optionally to transform the sequence of L tokens encoding the question Q, defined in an h dimensional space (which may be the result of a word encoding, a character encoding or the combination of both, with or without the use of the BiGRU) into a fixed size representation of dimension h×C, where C is a given constant. The adaptive max-pooling layer 113 may be a max-pooling layer with an adaptive kernel size that depends on L, the length of the original question Q. As a result, a matrix of fixed dimension adequately represents the input without any padding dimension, independently of the original length L.

For an input matrix $E^Q \in R^{h \times L}$, the kernel size (w) of the max-pooling according to the length of the input sequence and the required output shape may be $$w = \left\lceil \frac{L}{C} \right\rceil.$$

Then the output representation will be $O \in R^{h \times c}$ with $$O_{i,j} = \max_{k \in [j, j+w]} e_{i,k}^Q.$$

In a feature, L≥C, in which case the appliance of the adaptive max-pooling layer 113 leads to a compression of the original representation by the adaptive max-pooling layer 113. In an alternative embodiment, in the case where L<C, the sequence representation needs to be extended. A linear approximation may be used to compute the missing tokens.

This adaptive max pooling operation dynamically adapts the size of the pooling window according to the length L of the question Q.

Reading Blocks

After the above defined encodings and optional transformations, the input matrix $E^Q \in R^{h \times L}$ or the transformed input matrix $E^Q \in R^{h \times C}$ is used as a controller $U^0$ for a line of T attention-based reading blocks 115-1, . . . , 115-T, where each reading block t∈[1,T] receives the controller state $U^{t-1}$ as an input and outputs a transformed controller state $U^t$.

Reader of a Reading Block

At step t, i.e., in a given reading block t, given a controller state U" (which may be a controller state from a previous hop t−1), a reader 116 followed by an extractive attention module 117 compute an attention $A^t$ over the input document D, where $A^t$ is a vector of probability values giving the probability for each given token in $E^D$ that the given token is part of the answer span.

The reader 116 may be an extractive reader and include complete extractive question-answering architecture, such as the reader proposed in Clark and Gardner, "Simple and effective multi-paragraph reading comprehension", Proceedings of the 56th Annual Meeting of the Association for Computational Linguistics, ACL, Melbourne, 2018, which is herewith incorporated by reference in its entirety. In various implementations, another suitable machine reading model may be used. The extractive architecture in some embodiments may first compute and take into account a question/document attention (which may be referred to as bi-attention) followed by a document/document attention (which may be referred to as self-attention).

The bi-attention may be computed by the reader 116 between the (encoded) document D and the (encoded and optionally transformed, through adaptive max pooling) question Q. At the reading block t, the bi-attention becomes a bi-attention between the document and the controller state in the reading block t−1 (since the state of the controller $U^{t-1}$ represents the original question Q as transformed by the t−1 previous reading blocks). The bi-attention may be computed using an attention flow layer, such as the attention flow layer proposed in Seo et al., "Bidirectional attention flow for machine comprehension", in CoRR, abs/1611.01603, 2016, which is herewith incorporated by reference in its entirety.

In detail, for defining the bi-directional attention, a similarity matrix is first defined by:

$$S_{i,j} = W_1 e^D_{:,i} + W_2 u^{t-1}_{:,j} + W_3(e^D_{:,i} \odot u^{t-1}_{:,j}),$$

where $W_1$, $W_2$ and $W_3$ are trainable matrices, $e^D_{i,j}$ and $u_{i,j}$ are vectors of dimension h, each encoding a single token of the document and of the transformed question (i.e. the state of the controller $U^{t-1}$), respectively, and where the operator $\odot$ defines element-wise multiplication.

Given a similarity matrix S, the document-to-question attention (or context-to-query attention) ($c_q$), which signifies which words of the question have the highest similarity to each word of the document, may be given by:

$$(c_q)_{:,i} = \Sigma_{j=1}^C p_{i,j} u^{t-1}_{:,j},$$

with a weight $p_{i,j}$ given by $$p_{i,j} = \frac{\exp(S_{i,j})}{\sum_{k=1}^c \exp(S_{i,k})},$$

where C is the (possibly reduced) first dimension of U.

As to the question-to-document attention (or query-to-context attention) ($q_c$), which signifies which words of the document have the highest similarity to each word of the question, it may be given by:

$$(q_c)_{:,i} = \Sigma_{i=1}^P p_i e^D_{:,j},$$

with the softmax activation function $p_{i,j}$ (or $p_i$) given by $$p_{i,j} = \frac{\exp(m_i)}{\sum_{k=1}^c \exp(m_k)},$$

where the maximum m is given by $$m_i = \max_{j \in [1,C]} S_{i,j}.$$

The controller aware representation of the document may be calculated using the equation:

$$X_{:,i} = [e^D_{:,i}; (c_q)_{:,i}; e^D_{:,i} \odot (c_q)_{:,i}; (q_c)_{:,i} \odot (c_q)_{:,i}]$$

The same attention flow layer may be applied between the document and itself to produce a self-attention (Y), such as described in Wang et al., 2017, which is herewith incorporated by reference in its entirety.

Additional details regarding the definition and the role of the concepts of bi-attention and self-attention, can be found in Seo et al., 2016, and Wang et al., 2017, respectively, which describe examples for computing bi-attention and self-attention that can be used to implement the machine-reading system disclosed herein.

Turning back to FIG. 1, the reader t of the reading block t outputs two sets of probabilities $P^t_{start} = \{s_i\}_{i=1}^N$ and $P^t_{end} = \{e_i\}_{i=1}^N$, based on the previously computed bi-attention and self-attention. $P^t_{start}$ and $P^t_{end}$ represent the probability of each word in the encoded document $E^D$ being the beginning (start) of the answer span or the ending of this span, respectively. Additional details regarding the role of the reader and its architecture can be found in Clark and Gardner, 2018, which describes an example of such a reader that can be used to implement the machine-reading system disclosed herein.

Extractive Attention Layer of a Reading Block

In the extractive attention module 117 of the reading block t, $P^t_{start}$ and $P^t_{end}$ may be used to compute the probability of each given word being part of the answer span and use this value as the corresponding value of the attention vector $A^t$ for the given word. The probability of each word to be into the selected span is the probability that the span has started before this word and will end after:

$$a_i^t = (\Sigma_{k=0}^i s_k)(\Sigma_{k=i}^N e_k).$$

The extractive attention module 117 may rescale the attention to be between 0 and 1, such as using the equation:

$$a_i^t = \frac{a_i^t}{\max_j a_j^t - \min_j a_j^t}.$$

Controller Update Module of a Reading Block

Given the encoding of the document $E^D \in R^{h \times N}$, the previous state of the controller $U^{t-1} \in R^{h \times C}$ and the attention vector $A^t \in R^N$, the objective of the controller update module 118 is to compute an updated version of the controller $U^t \in R^{h \times C}$. This objective may be achieved by weighting each token of the representation of the document with its associated attention (i.e., the corresponding value of the attention vector $A^t$ produced by the extractive attention module 117) to compute $\tilde{E}^D \in R^{h \times N}$ with $\tilde{e}_{i,j}^D = a_j e_{i,j}^D$.

If the optional adaptive max-pooling layer 113 defined previously was used to transform the question Q to a fixed size representation, the adaptive max-pooling layer may be used again (not shown on FIG. 1) to map $\tilde{E}^D \in R^{h \times N}$ to $V^t \in R^{h \times C}$. To update U with V, $U^{t-1}$ and $V^t$ may then be concatenated in the embedding space and fed into a BiGRU layer. The intermediate representations of the BiGRU may then be concatenated to get an updated version of the controller of size h×C.

$$U_{i,j} = \text{BiGRU}(U_{i,j-1}^t; [V_{i,j}^t; U_{i,j}^{t-1}]).$$

In this example, $U^0$ may be initialized with the adaptive max-pooling layer 113 applied to the encoding of the question $E^Q$ (as shown in FIG. 1).

Answer Module

An answer module 120 may receive as input the representation of the encoded document $E^D$ and the last state of the controller $U^T$. The answer module 120 may be configured to compute answer outputs 122 to predict 1) whether the question is a binary (i.e. a "yes/no" question) or an extractive one (i.e. a question that can be answered to with a span of the document D, being the answer span mentioned above), for example in that a set of probabilities is output, including the probability that the answer to the question is "yes", the probability that the answer is "no", and the probability that the answer is a span of the document; 2) the starting and 3) ending probabilities of the answer span (which are used to determine the answer span if the question is determined to be an extractive one); and 4) the supporting facts. In a feature, the answer module 120 has the model architecture described in Yang et al., 2018, which is herewith incorporated by reference in its entirety. The answer module may include a three-way classifier implemented to produce the probabilities of having an answer being "yes", "no", or a span of the document D.

The bi-attention detailed above for the reader becomes a bi-attention between the document and the final controller state in the answer module $U^T$ (which represents the original question Q as transformed by the T reading blocks). In an embodiment, the bi-attention may also be computed using the attention flow layer proposed in Seo et al., 2016.

On the top of this representation, one or more (e.g., four) BiGRU layers may optionally be stacked. The BiGRU layer(s) goals are to supervise the supporting facts (first layer), the starting (second layer) and ending (third layer) probabilities of each word of the document. The fourth layer may be used to implement the above mentioned three-way classifier to predict if the answer of a given question is yes, no, or a span of the document.

$$Y_t^{sp} = \text{BiGRU}(y_{t-1}, y_t) Sp = \text{BiGRU}(y_{t-1}^{sp}, y_t^{sp})$$

$$Y_t^{start} = \text{BiGRU}(y_{t-1}^{sp}, y_t^{sp}) P_t^{start} = W_s Y_t^{start}$$

$$Y_t^{end} = \text{BiGRU}(y_{t-1}^{start}, y_t^{start}) P_t^{end} = W_e Y_t^{end}$$

$$Y_t^{clas} = \text{BiGRU}(y_{t-1}^{end}, y_t^{end}) P_t^{class} = W_c Y_t^{class}$$

where $W_s \in \mathbb{R}^{h \times 1}$, $W_c \in \mathbb{R}^{h \times 1}$ and $W_e \in \mathbb{R}^{h \times 3}$ are trainable parameters.

For any further details on the role of the answer module and its architecture, and in particular details regarding how the type of the answer (yes/no/span of the document) is determined, how the start and the end of the answer span are identified, or how the supporting facts are determined, it is referred to Yang et al., 2018, which describes an example of an answer module that can be used to implement the machine-reading system disclosed herein.

Multi-Head Version

In a feature, a multi-head version of the architecture of FIG. 1 can be implemented. In this architecture, K independent reading heads collect (accumulate) pieces of information before feeding them into the answer module 120. Each reading head corresponds to one independent implementation of the architecture of FIG. 1, up to the answer module 120, while the answer module 120 is common to all the reading heads. For each reading head, a same number T of reading blocks may be used. Thus, each reading head produces a matrix being a last state of the controller $U^T$, and the K reading heads provide K independent matrices $U^T$. Finally, these K matrices are summed to compute the input of the answer module 120. The heads may naturally produce different outputs, or two or more of the heads may produce the same output.

Weak Supervision of the Answer

In a feature, only the first occurrence of the answer may be labelled as positive and the others may be labelled as negative. In other features, called weak supervision of the answer, all occurrences of the answer in the supporting facts may be labelled to be positive.

Experimental Settings and Results

Table 1 gives the values of the hyper-parameters used during the training of the model. Pre-trained Glove word embeddings were used in the encoder 111 to encode the words of the question Q and the document D. Further, the model was optimized using a stochastic gradient descent with an initial learning rate of 0.5. As learning rate schedule, the learning rate is divided by two when the loss over the development set does not decrease for two consecutive steps. As stopping criteria, the training process is ended when the learning rate becomes smaller than 0.005.

TABLE 1

| Reference | Value | Comment |
|---|---|---|
| d | 300 | Embedding size |
| C | 100 | Size of the controller |
| h | 75 | Hidden size of the BiGRUs |
| T | 2 | Number of reading blocks |
|  | 0.1 | Learning rate |

Table 2 presents the performance of the multi-step reading architecture described above ("Present Model") on the HotpotQA dataset in its distractor setting. Exact match (EM) and F1 are two evaluation metrics. The Present Model outperforms the given Baseline Model for answer prediction ("Answer"), and supporting facts prediction ("Sup Fact").

TABLE 2

|  | Answer | | Sup Fact | | Joint | |
|---|---|---|---|---|---|---|
| Model | EM | $F_1$ | EM | $F_1$ | EM | $F_1$ |
| Baseline Model | 44.44 | 58.28 | 21.95 | 66.66 | 11.56 | 40.86 |
| Present Model | 50.38 | 64.92 | 27.80 | 73.04 | 15.96 | 49.24 |

Advantages

To evaluate the technical impact of the different components of the model described above, an ablation analysis has been performed. In order to study empirically the technical impact of sequential reading (i.e., the impact of T (the number of reading blocks) on the final results), the above model has been compared to a similar architecture without the sequential updating of the state of the controller (i.e., with one single reading block, which means T=1).

The sequential association of reading blocks and controller update modules provides benefits. F1 score decreases by 8.9 points for the answer prediction task and 5.7 points for the evidence extraction task when the model does not have the capability to reformulate the question. Thus, the sequential stack of reading blocks technically improves the efficiency of the system to properly answer questions.

The impact of K (the number of parallel heads) on the efficiency of the system is less important than the one of T but still remains significant. Indeed, the configuration that uses only a single head (K=1) stands 1 point below a better model (in terms of F1 score).

As to the weak supervision of the answer as defined above (i.e., the feature according to which all occurrences of the answer in the supporting facts are labelled to be positive), the weak supervision also improves the efficiency of the system in that it increases the joint F1 score by 0.8 points.

The impact of the self-attention layer in the reading module on the efficiency of the model is significant. The omission of this layer decreases the F1 score by 8.9 points on the joint metric. This outlines the ability to propagate long-range information between the different paragraphs and not only in the local neighborhood of a token.

The example where the question representation is reduced to a vector instead of a matrix (i.e., the dimension of the fixed representation space is reduced to C=1) drops the joint F1 score by 13.3 points. This highlights the importance of preserving a representation of the question as a matrix and not a vector to maintain its meaning.

Embodiments

Figure 2:
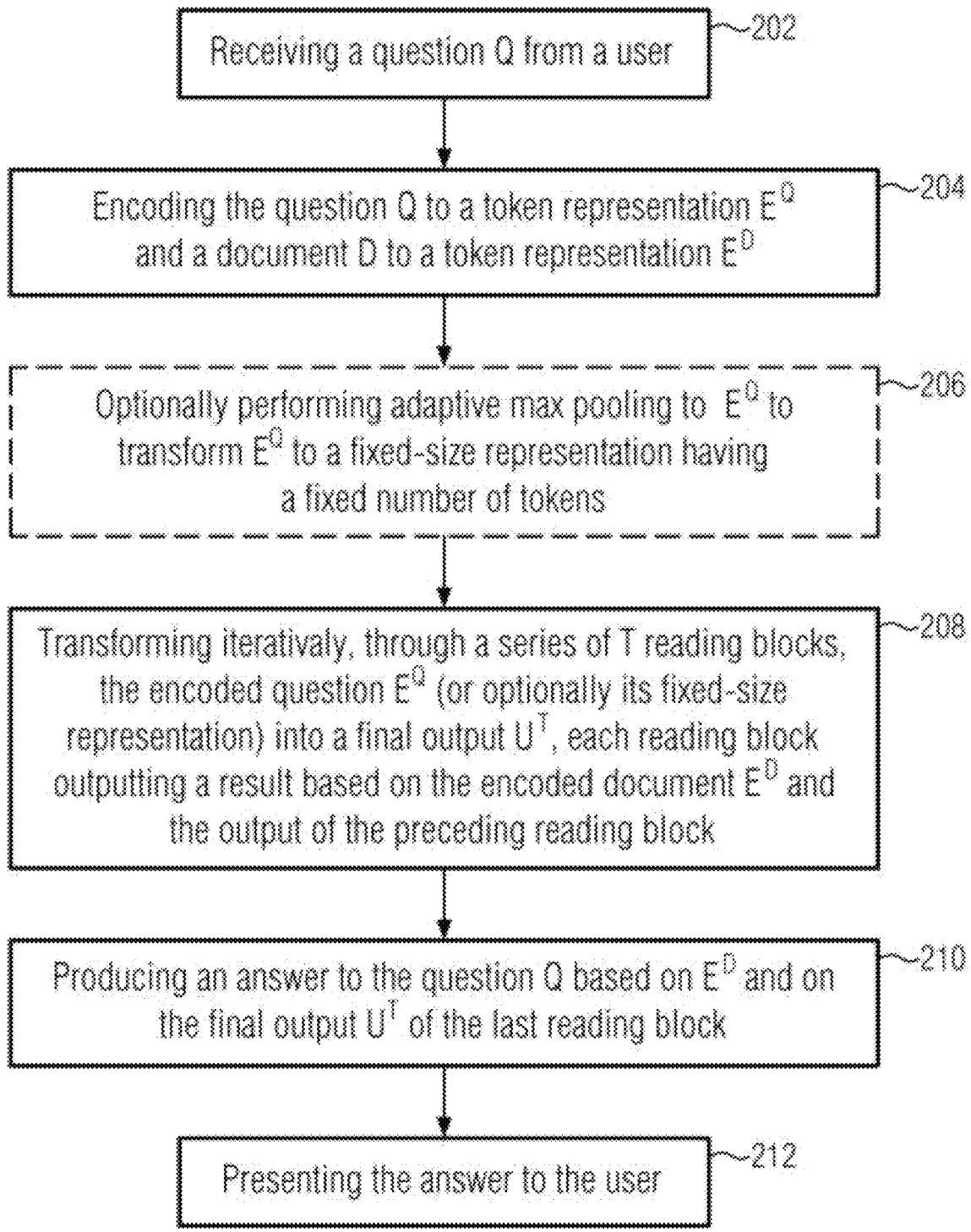
FIG. 2 is a functional block diagram illustrating a method for answering a question based on a document.

Embodiments will now be described in detail in relation to the above and by reference to the drawing of FIG. 2, which is a flowchart illustrating a computer-implemented method for answering a question Q based on a document D. The method may be executed by one or more processors executing code. The described examples can be combined one with another within the final implementation of the machine-reading system disclosed herein.

Control begins with 202, at which a question Q 102 is received from a computing device, such as via a network (e.g., the Internet). The question includes a set of words input by the user. For example, the question can be typed by the user into an input field of a user interface, or, in a speech-based system, the question can be spoken by the user and receive via a microphone. In the example of speech input, a language processing module may convert the speech to text, such as using natural language processing (NLP) or another suitable type of speech to text conversion.

At 204, the question Q 102 is encoded by an encoder like the encoder 112 of FIG. 1, which outputs a representation $E^Q$ of the question made of a set of embeddings, one for each word of the question, in an embedding space. As detailed above, the encoding can be performed at word-level, at character-level (each word of the question including one or more characters), or at both word-level and character-level. In the example of both word and character-level, both embeddings from the word-level encoding and the character-level encoding for a single word of the question may be concatenated. For example, pre-trained Glove word embeddings can be used for this purpose, or another suitable word and/or character embedding model may be used.

Similarly, a pre-existing document D, includes a set of words and may include a correct answer to the question Q, is also encoded by an encoder like encoder 111 of FIG. 1. The encoder 111 outputs a representation $E^D$ of the document D made of a set of embeddings, one for each word of the document, in the embedding space. Again, the encoding can be performed at word-level, at character-level (each word of the document including one or more characters), or at both word-level and character-level. In the example of both word and character-level, both embeddings from the word-level encoding and the character-level encoding for a single word of the document may be concatenated. In various implementations, the same encoder (i.e., an encoder making use of the same encoding algorithm) may be used for both the question and the document. In other words, the same encoder may be used by the encoders 111 and 112, and the resulting embeddings pertain to the same embedding space. However, in various implementations, two distinct encoders 111 and 112 can be used for encoding the document and the question, respectively.

Optionally at 206, an adaptive max pooling layer 113, such as the adaptive max pooling layer 113 of FIG. 1 may be applied to the encoded question $E^Q$ to transform the encoded question $E^Q$ (which is a variable size representation of dimension h*L, where h is the dimension of the embeddings/encodings, i.e., the predetermined constant size of each token, which depends on the chosen encoding algorithm, and L is the (variable) length of the question) into a fixed-size representation of dimension h*C, where C is a predetermined constant. In this optional embodiment, another adaptive max pooling layer (which, in an embodiment, is the same as the one applied to the encoded question $E^Q$) will also be applied to a weighted version of $E^D$ in the controller update module 118 of each reading block t, the role of which will be detailed below.

At 208, the representation of the document $E^D$ (with or without max pooling) and a current representation of the question (initially $E^Q$ with or without max pooling, then a transformed representation of $E^Q$ called a controller state $U^t$ as output by each controller update module 118 of each reading block 115-$t$, where t is an integer between 1 and the total number T of reading blocks) are iteratively fed into a stack of T reading blocks 115-1, . . . , 115-T. The original controller state $U^0$ is defined to be equal to the encoded question $E^Q$, with or without max pooling, depending on the embodiment. Thus, at each step t, the reader t of the reading block 115 receives as input the encoded document $E^D$ and the updated value of the transformed question $U^{t-1}$, and outputs two sets of probabilities $P^t_{start}$ and $P^t_{end}$, which represent the probability of each word in the encoded document $E^D$ to be the beginning of the answer span or the ending of this span, respectively, as detailed above. $P^t_{start}$ and $P^t_{end}$ are then received as input of the extractive attention module 117, which outputs a corresponding attention $A^t$, as detailed above. Finally, the obtained attention $A^t$ and the representation of the document $E^D$ (with or without max pooling) are inputted into the controller update module 118, which outputs an updated value $U^t$ of the transformed question (also called controller state), which is used as input in the next reading block $U^{t+1}$. The last reading block outputs the final value $U^T$ of the transformed question, which is sent to the answer module 120. As described above, multiple parallel encoders and reading blocks may feed into the answer module 120.

At 210, the answer module 120 receives as input the representation of the document $E^D$ (with or without max pooling) and the final value $U^T$ of the transformed question and outputs a set of probabilities in order to answer the initial question Q, as detailed above, a probability that the answer to the question is yes, a probability that the answer to the question is no, and a probability that the answer is a span of the document. Further, the answer module 120 outputs for each word of the document a probability that this word is the first word of the answer span and a probability that this word is the last word of the answer span. Finally, the answer module 120 outputs the supporting facts, i.e., the sentences that have been used to predict the answer. The answer module 120 transmits the answer to the computing device (that transmitted the question) via the network.

At 212, the computing device outputs an answer 122 to the question to a user. For example, the computing device may display the answer 122 on a display, output the answer 122 via one or more speakers, or output the answer 122 in another suitable manner. In an embodiment, the answer 122 may be the one of the answers having the highest probability among the three possible answers being yes, no, or a span of the document. In case it is determined that the question is to be answered by an answer span (for example in case the probability that the answer is a span of the document is higher than the respective probabilities of having an answer being yes or no), the answer span is determined to be the span of the document beginning at the word having the highest probability that this word is the first word of the answer span and ending at the word having the highest probability that this word is the last word of the answer span. Optionally, the supporting facts output by the answer module 120 may also be provided to the user together with the answer to the question. The computing device may also output the supporting facts to the user. In various implementations, the answer (and optionally the supporting facts) can be provided to the user as written sentences in a user interface on the display of a computing device. Additionally or alternatively, the answer (and optionally the supporting facts) can be provided to the user audibly via one or more speakers. However, the machine-reading system disclosed herein is not limited to these embodiments and any other alternative means for outputting the answer and presenting it to the user are also encompassed in the present disclosure.

More generally, it is noted that the examples and exemplary embodiments given above are not meant to be restrictive and that all the alternative embodiments that a skilled person would consider in order to implement the same general idea are also contemplated without departing from the scope of the present disclosure. While some specific embodiments have been described in detail above, it will be apparent to those skilled in the art that various modifications, variations and improvements of the embodiments may be made in the light of the above teachings and within the content of the appended claims without departing from the intended scope of the embodiments. In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) includes, stored thereon, the computer program or the computer-executable instructions for performing one of the methods described herein when it is performed by a processor. In a further embodiment, an apparatus includes one or more processors and the storage medium mentioned above.

In a further embodiment, an apparatus includes means, for example processing circuitry like e.g. a processor communicating with a memory, the means being configured to, or adapted to, perform one of the methods described herein.

A further embodiment includes a computer having installed thereon the computer program or instructions for performing one of the methods described herein.

Figure 3:
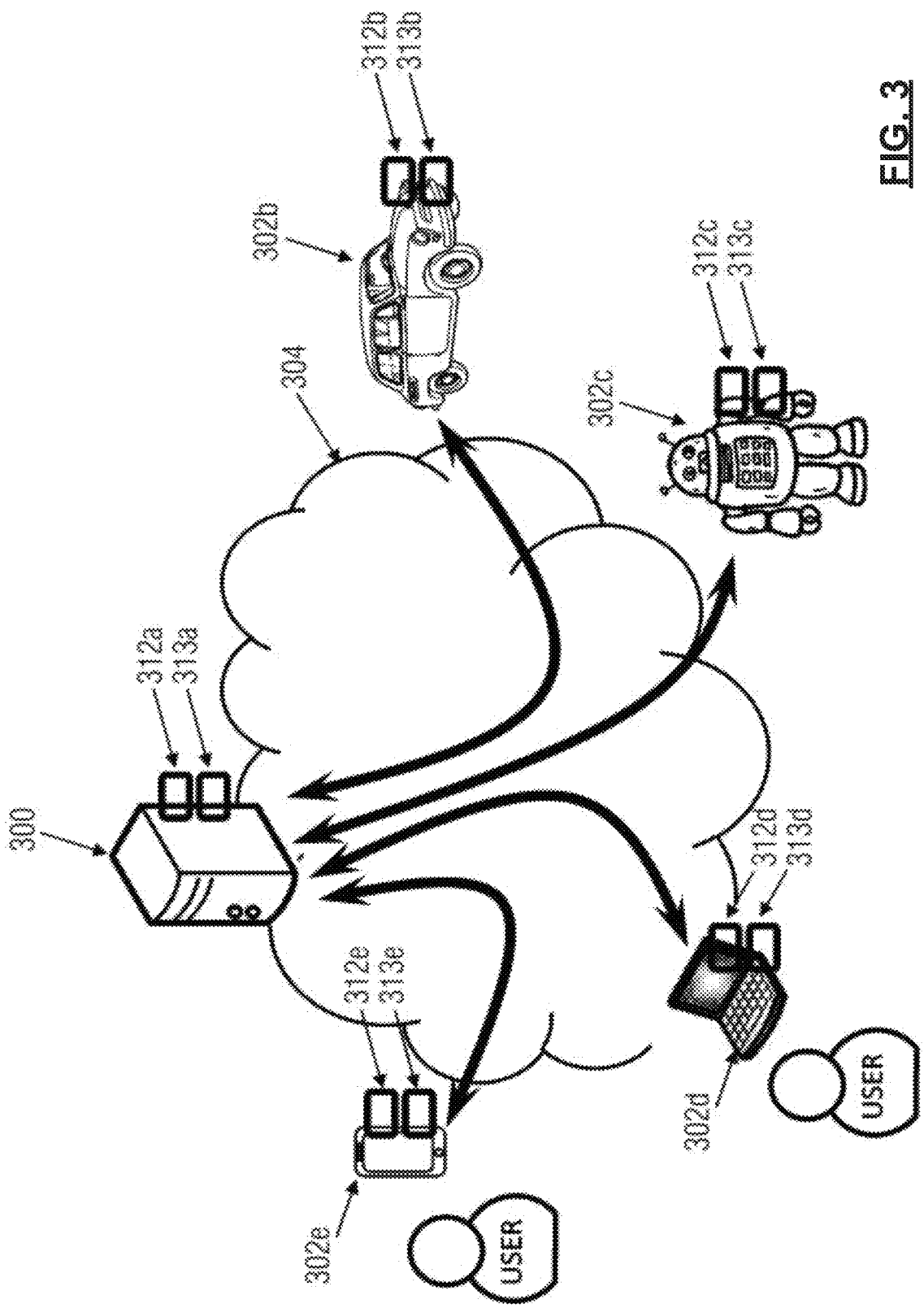
FIG. 3 illustrates an example of system architecture in which the disclosed methods may be performed.

The above-mentioned methods and embodiments may be implemented within a system architecture, such as illustrated in FIG. 3, which includes server 300 and one or more client devices 302 that communicate over a network 304 (which may be wireless and/or wired) such as the Internet for data exchange. The server 300 and the computing devices 302 include a data processor (a processor) 312 (e.g., 312a-e) and memory 313 (e.g., 313a-e) such as a hard disk. The computing devices 302 may be any type of computing device that communicates with the server 300, such as an autonomous vehicle 302b, a robot 302c, a computer 302d, or a cellular phone 302e.

In an example, the question Q 102 is provided by a client device 302 to the server 300. In various implementations, the question Q 102 is received directly at the server 300. The question Q 102 and the document D 101 are processed at the server 300, which returns an answer to the question Q 102 to the client device 302 that transmitted the question Q 102. The server 300 may also select the document from a plurality of possible documents, for example, based on the question Q 102. In various implementations, the question Q 102 and the document D 101 can be processed at the client device 302 that initiated the question. Training of the model may also be performed at the server 300, at a different server, or at the client device 302.

As discussed above, multi hop text based question answering involves sequentially integrating facts from multiple passages to answer complex natural language questions. A multi hop parallel attentive network is discussed above and is configured to perform question answering tasks that involve reasoning capabilities. The network includes reading and reformulation/update modules (one reading module and reformulation module per hop). Each reading block described above is one hop. The output of one reading block is input to the next reading block. The reading modules produce question aware representations (e.g., matrix representations) of the document. From these representations, the reformulation module extracts elements to calculate an updated representation of the question. The updated question is then input to the following hop/reading block.

The present application involves reading blocks that collect information sequentially and in parallel across a document to answer a question. An input length invariant question representation may be updated by a dynamic max pooling layer that compacts information from a variable length text sequence (e.g., the question) into a fixed size matrix. An extractive reading based attention mechanism computes the attention vector from the output layer of an extractive machine reading model.

The multi hop question answering of the present application involves both sequential reasoning and parallel reasoning. Sequential reasoning involves reading a document, seeking a piece of information, then reformulating the question and finally extracting the correct answer. Parallel reasoning involves collecting pieces of evidence for comparisons or questions that involve checking multiple properties in the documents.

FIG. 4 includes two examples of multiple hop question answering given questions (Q) and answers (A). P1 and P2 in each instance are first and second paragraphs (P) that provide different pieces of information that are relevant to answering the question (Q). The top example of FIG. 4 illustrates parallel reasoning where information from the first paragraph (P1: Lit) is compared with information from the second paragraph (P2: Adorable) to determine the answer (A: Adorable) to the question (Q). The bottom example of FIG. 4 illustrates sequential reasoning where information from the first paragraph (P1: Apratim) is used to identify information from the second paragraph (P2: Sarod) used to determine the answer (A: stringed instrument) to the question (Q).

Figure 5:
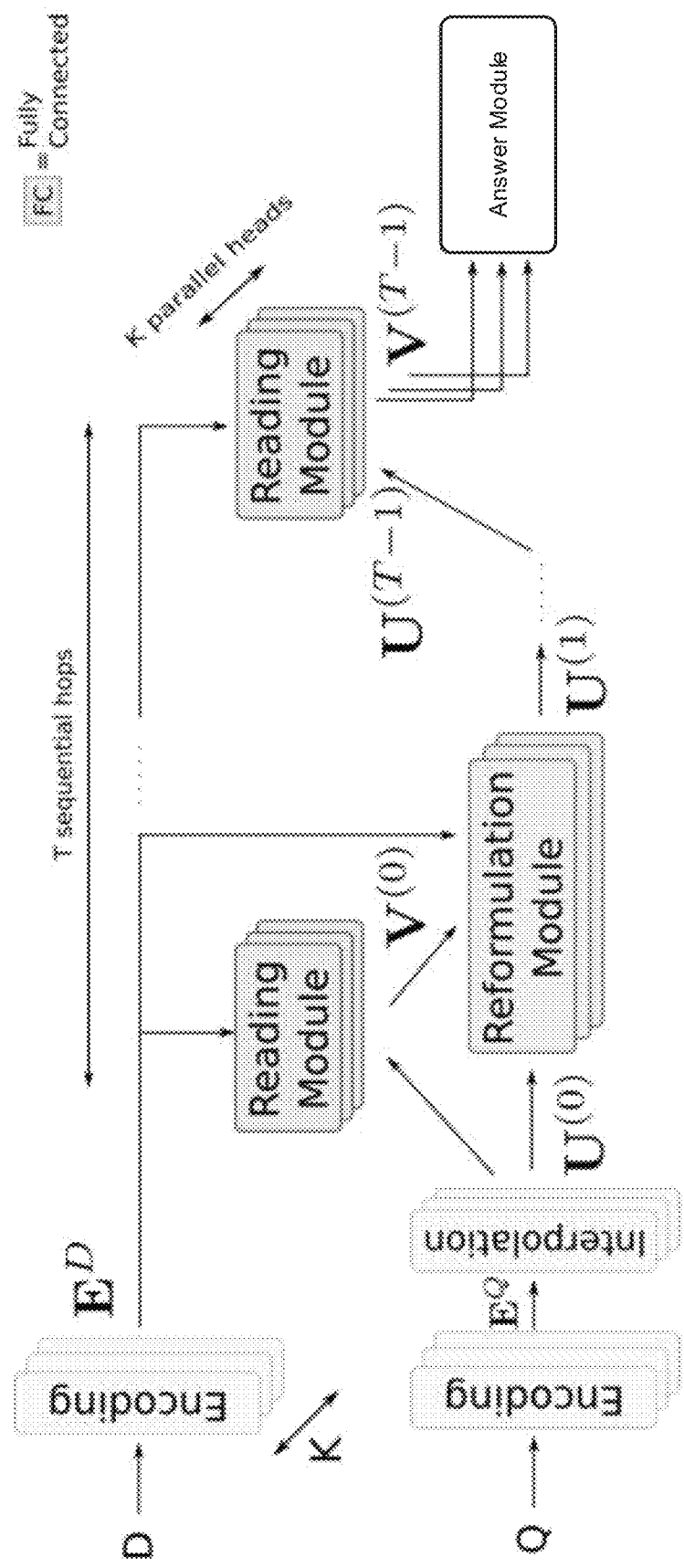
FIG. 5 is a functional block diagram of an example implementation of the multi-hop model of FIG. 1.

FIG. 5 is a functional block diagram of an example implementation of the multi-hop model of FIG. 1. As discussed above, the multi-hop model includes four modules: (1) an encoding module, (2) a reading module, (3) a question reformulation module, and (4) an answering module. The encoding module is an input module, the answering module is an output module. A set of reading and question reformulation modules form a hop. As discussed above, the multi-hop model includes multiple (T, where T is at least 2) hops. The answering module does not require a reformulation.

Given a document and a question, the reading module computes a question-aware representation of the document. The reformulation module extracts essential elements from this document representation and uses them to update a representation of the question in a latent space. This reformulated question is passed to the following hop.

The multi-hop model can have multiple heads, as discussed above and as further discussed below. In this case, the iterative mechanism is performed several times in parallel in order to compute a set of independent reformulations. The final representations of the document produced by the different heads are aggregated (e.g., by an aggregation module, such as summed by a summation module) before being fed to the answering module. The answering module generates the answer and the supporting facts from the aggregation or the reformulated question from the last hop.

The multi-hop model includes K independent reading heads that process the document and question in parallel. For simplicity, subscripts of all of the matrices by the index of the head are not provided as to focus on the description of one.

A standard representation is adopted of each token herein by using the pre-trained parametric language model BERT. Let a document $D=\{p_1; p_2; \ldots ; p_{10}\}$ be the set of input paragraphs of respective lengths $\{n_1; \ldots ; n_{10}\}$, associated to a question Q of length L. The paragraphs are independently encoded through an encoder, such as a pre-trained BERT model. Each token is represented by its associated BERT hidden state from the last layer of the model. The token representations are concatenated to produce a global representation of the set of 10 paragraphs of total length $$N = \sum_{i=1}^{10} n_i$$

The representations are further passed through a Bidirectional Gated Recurrent Unit (BiGRU) to produce a final representation of the document $E^D \in \mathbb{R}^{N \times 2h}$ and question $E^Q \in \mathbb{R}^{L \times 2h}$ where h is the hidden state dimension of the BiGRUs.

$E^Q$=BiGRU(Bert(Q)),$E^D$=BiGRU(Bert($p_1$); ... ;Bert($p_{10}$)), where ; is the concatenation operation. While the example of 10 paragraphs is provided, another suitable number of paragraphs may be used.

To compute the first representation of the question $U^{(0)}$, an interpolation module may map $E^Q \in \mathbb{R}^{L \times 2h}$ to $U^{(0)} \in \mathbb{R}^{M \times 2h}$ where M is an hyperparameter of the model. $\mathbb{R}^{M \times 2h}$ corresponds to the space allocated to store the representation of the question and its reformulations. It does not depend on the length of the original question L.

Reading Module

Figure 6:
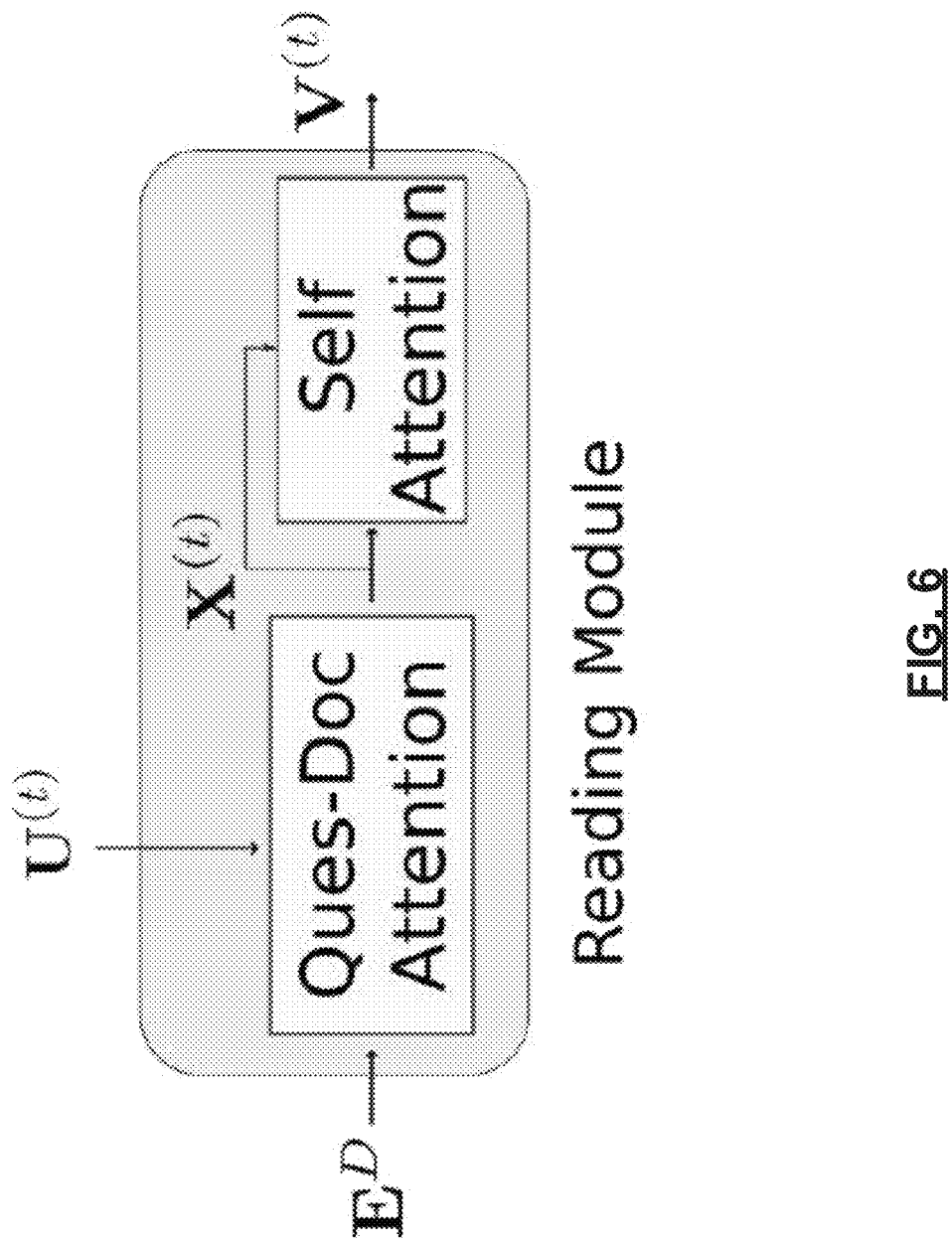
FIG. 6 is a functional block diagram of an example implementation of a reading module of a multi-hop model.

The multi-hop model includes T hops of reading that sequentially extract relevant information from a document regarding the current reformulation of the question. At step t, given a representation of the reformulated question $U^{(t)} \in \mathbb{R}^{M \times 2h}$ and a representation of the document $E^D \in \mathbb{R}^{N \times 2h}$ the reading module computes a question-aware representation of the document. The reading module includes two layers: a document-question attention module followed by a document self-attention module. FIG. 6 is a functional block diagram of an example implementation of a reading module.

Regarding the document-question attention module, this module builds an interaction matrix between the document and the current reformulation of the question $S \in \mathbb{R}^{N \times M}$ as $S_{i,j} = w_1 E_{i,:}^D + w_2 U_{j,:}^{(t)} + w_3 (E_i^D \odot U_j^{(t)})$ where $w_1$, $w_2$, $w_3$ are Trained or Trainable Vectors of $\mathbb{R}^{2h}$ and $\odot$ is Element-Wise multiplication. Then, the reading module computes the document-to-question attention $C^q \in \mathbb{R}^{N \times 2h}$:

$$P_{i,j} = \frac{\exp(S_{i,j})}{\sum_{k=1}^{M} \exp(S_{i,k})}, \quad C_{i,:}^q = \sum_{j=1}^{M} P_{i,j} U_j^{(t)}$$

And the question-to-document attention $q^c \in \mathbb{R}^{2h}$:

$m_i = \max_{j \in \{1, \ldots, M\}} S_{i,j}, p = \text{softmax}(m), q^c = \sum_{j=1}^{N} p_j E_{j,:}^D$.

The reading module computes the question-aware representation of the document $X^{(t)} \in \mathcal{R}^{N \times 8h}$:

$X_{i,:}^{(t)} = [E_{i,:}^D; C_{i,:}^q; E_{i,:}^D \odot C_{i,:}^q; q^c \odot C_{i,:}^q]$ where [;] is the concatenation operation. The reading module may include a last BiGRU that reduces the dimension of $X_{(t)}$ to N×2h. This specific attention mechanism with such token-level attention may produce a finer-grained representation of the document compared to sentence-level attention used other architectures.

Regarding document-self attention, the contextualization between the ten paragraphs has been done by the BiGRUs as discussed above. A limitation of the current representation of the document may be that each token has very limited knowledge of the other elements of the context. To deal with long-range dependencies, the same attention mechanism may be applied between the question-aware representation of the document, $X^{(t)}$ and itself to produce the reading module output $V \in \mathbb{R}^{N \times 2h}$. This self-contextualization of the document has been found useful, as discussed herein.

Question Reformation Module

Figure 7:
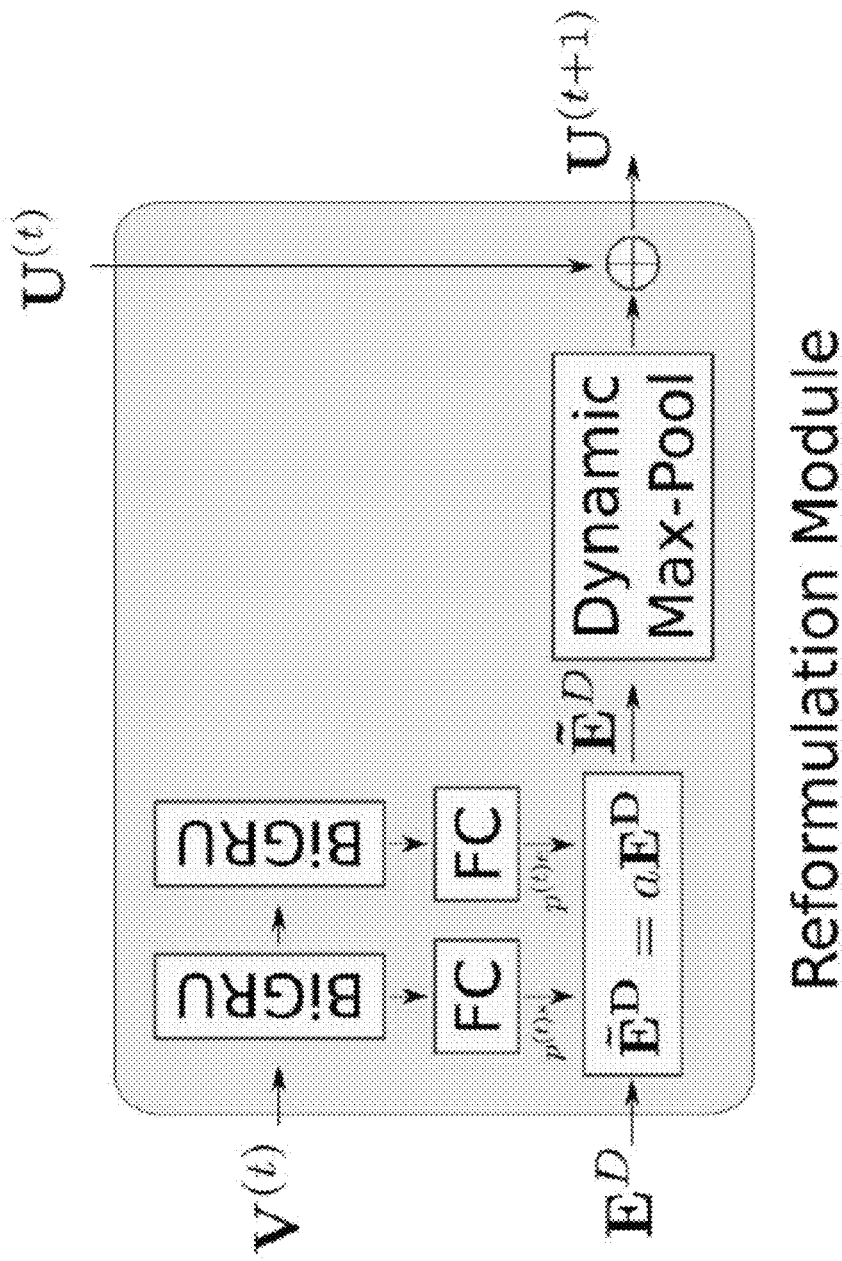
FIG. 7 is a functional block diagram of an example implementation of a reformulation module of a multi-hop model.

A functional block diagram of an example reformulation module is provided in FIG. 7. A reformulation module t takes as input the output of the previous attention module $V^{(t)}$, the previous representation of the reformulated question Um, and an encoding of the document $E^D$. The reformulation module generates based on the inputs an updated reformulation of the question $U^{(t-1)}$.

Regarding reading based attention, given $V^{(t)}$, a reformulation module computes $p^{(t)s} \in \mathbb{R}^N$ and $p^{(t)e} \in \mathbb{R}^N$ using two BiGRUs followed by a linear layer and a softmax operator. The computations are performed from $Y^{(t)s}$=BiGRU($V^{(t)}$)$Y^{(t)e}$=BiGRU($Y^{(t)s}$)

$p^{(t)s}$=softmax($w_s Y^{(t)s}$)$p^{(t)e}$=softmax($w_e Y^{(t)e}$), where $w_e$ and $w_s$ are trained or trainable vectors of $\mathbb{R}^h$. The probability vectors $p^{t(s)}$ and $p^{(t)e}$ are used to compute a reading-based attention vector $a^{(t)}$ over the document. The probabilities represent the belief of the model at step t of the probability for each word to be the beginning and the end of the answer span. The reading-based attention of a token may be the probability that the predicted span has started before this token and will end after and can be computed as follows:

$$a_i^{(t)} = \left(\sum_{k=0}^{i} p_k^{t(s)}\right)\left(\sum_{k=i}^{N} p_k^{t(e)}\right)$$

The attention values may be used to re-wright each token of the document representation. The following may be computed $\tilde{E}^{(t)D} \in \mathcal{R}^{N \times 2h}$ with $\tilde{E}_{i,j}^{t(D)} = a_j E_{i,j}^{D}$.

Dynamic Max Pooling

A dynamic max pooling module may be used to collect relevant elements of $\tilde{E}^{(t)D}$ to add the current representation of dimension M×2h. This module may partition the row of the initial sequence into M approximately equal parts to produce a grid of M×2h in which a max-pooling operator is applied in each individual window. As a result, a matrix of fixed dimension represents the input, preserves the global structure of the document, and focuses on important elements of each region.

Let $\tilde{E}^{(t)D}$ be the input matrix representation. The dynamic max pooling module computes the kernel size, w, of the max pooling according to the length of the input sequence and the required output shape w=[N/M], [.] being the ceiling function. The output representation of the max pooling will be $O^{(t)} \in \mathbb{R}^{M \times 2h}$ where $$O_{9,j}^{(t)} = \max_{k \in iw, \ldots, (i+1)w}(S_{k,j}).$$

To compute the updated representation of the question $U^{(t+1)} \in \mathbb{R}^{M \times 2h}$, $U^{(t)}$ and $O^{(t)}$ may be summed (added).

Answering Module

Figure 8:
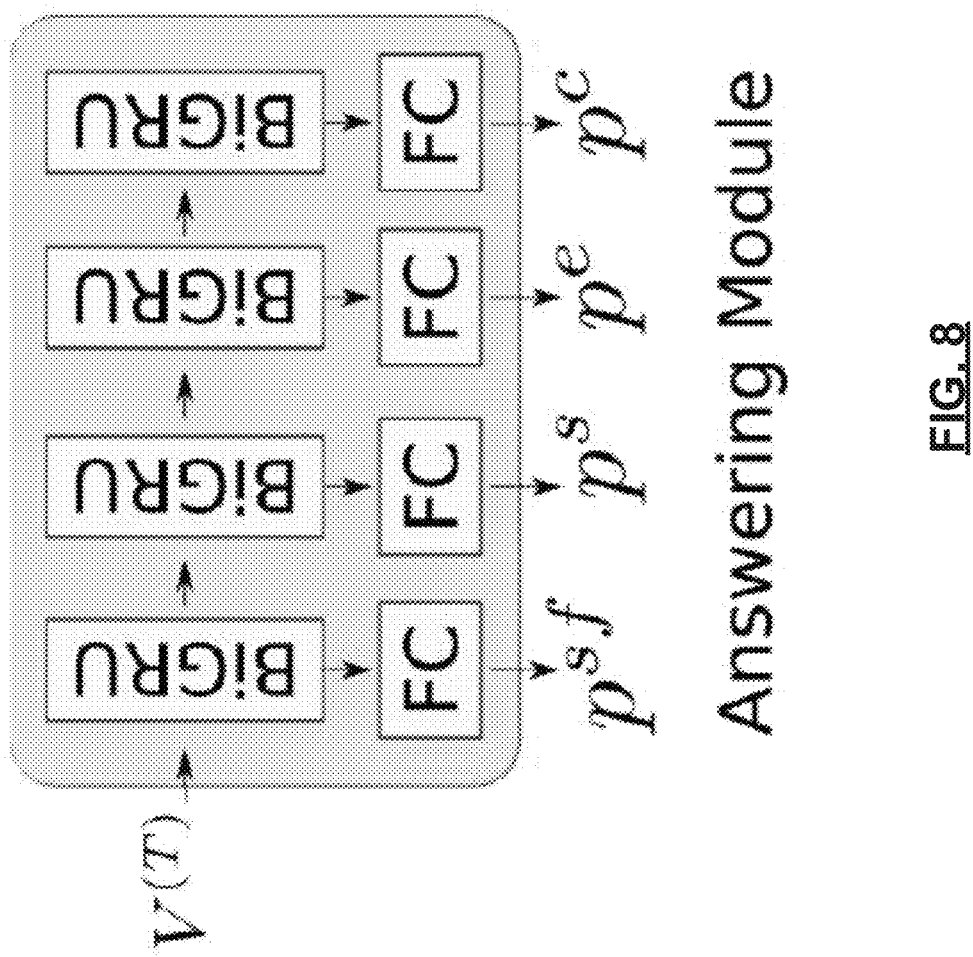
FIG. 8 is a functional block diagram of an example implementation of an answering module of a multi-hop model.

A functional block diagram of an example answering module is provided in FIG. 8. The answering module may include four BiGRUs with each followed by a fully connected (fc) layer. The BiGRUs supervise the supporting (1) the supporting facts $p^{sf}$ (2) the answer starting and (3) answer ending probabilities, $p^e$, $p^s$, of each word of the document. The last BiGRU may be used as a three-way classifier to predict the probability of the answer being classified as yes, no, or a span of text.

$$Y^{sf} = \text{BiGRU}(V^{(t)}) Y^s = \text{BiGRU}(Y^{sf}) Y^e = \text{BiGRU}(Y^s)$$

$$Y^c = \text{BiGRU}(Y^e) p^s = \text{softmax}(w_s Y^s)$$

$$p^e = \text{softmax}(w_e Y^e) p^c = \text{softmax}(w_c Y^c)$$

where $w_s \in \mathbb{R}^h$, $w_e \in \mathbb{R}^h$, and $w_c \in \mathbb{R}^{h \times 3}$ are trained or trainable parameters.

To predict the supporting facts, the answering module constructs a sentence based representation of the document. Each sentence may be represented by the concatenation of its starting and ending supporting fact tokens from $Y^{sf}$. The answering module computes $p^{sf}_{i,j}$ the probability of the sentence j of example I being a supporting fact with a linear layer followed by a sigmoid function.

Multiple Head Version

The multi hop model may include multiple heads. This implementation may include a plurality of independent parallel heads, as discussed above. Each head may include the same number of reading and reformulation modules. Each head produces a representation $V_k^{(T)}$ of the document. A summation module may sum the k matrices produced by the k heads to generate the input to the answering module.

Training

The multi hop model may be trained by jointly optimizing three subtasks. The three subtasks may be finding the supporting facts, identifying the span, and the classification of yes, no, or span. The training may be to minimize a linear combination of the supporting facts loss $\mathcal{L}_{sf}$, the span loss $\mathcal{L}_{span}$, and the class loss $\mathcal{L}_{class}$. Let $N_d$ be the number of examples in the training dataset. $\mathcal{L}_{sf}(\theta)$ may be defined by $$\mathcal{L}_{sf}(\theta) = \frac{1}{N_d} \sum_i^{N_d} \frac{1}{nbs_i} \sum_j^{nbs_i} \left(p_{i,j}^{sf} - y_{i,j}^{(1)}\right)^2,$$

where $nbs_i$ corresponds to the number of sentences in the document i, $y_{i,j}^{(1)}$ being 1 if the sentence j of the document i is a supporting fact and 0 otherwise.

It may be assumed that all the mentions of the answer in the supporting facts are related to the question. The answering module may tag as a valid solution, the start and end positions of all occurrences of the answer in the given supporting facts. $\mathcal{L}_{span}$ may be defined by $$\mathcal{L}_{span}(\theta) = \frac{1}{N_d} \sum_i^{N_d} \frac{1}{2} D_{KL}\left(p_i^s \| y_i^{(2)}\right) + D_{KL}\left(p_i^e \| y_i^{(3)}\right),$$

where $y_i^{(2)} \in \mathbb{R}^N$, $y_i^{(3)} \in \mathbb{R}^N$ are vectors including the value $1/n_i$ at the start and end positions of all occurrences of the answer and 0 otherwise; $n_1$ being the number of occurrences of the answer in the context.

$\mathcal{L}_{class}$ may be defined by $$\mathcal{L}_{class}(\theta) = -\frac{1}{N_d} \sum_i^{N_d} \log\left(p_{i,y_i^{(4)}}^c\right),$$

where $y_i^{(4)}$ corresponds to the index of the label of the question type {yes, no, span}. The training loss may be determined as follows.

$$\mathcal{L}(\theta) = \mathcal{L}_{class}(\theta) + \alpha \mathcal{R}_{span}(\theta) + \beta \mathcal{L}_{sf}(\theta)$$

where alpha and beta are hyperparameters tuned (trained) via cross-validation.

FIGS. 9 and 10 include example questions, answers, and portions of documents before and after reformulation. FIGS. 9 and 10 illustrate that the multi hop model described herein tends to follow a natural reasoning path to answer bridge questions. As illustrated in the top portion of FIG. 9, before the first reformulation module, the attentions tend to focus on the first step of reasoning. For the question "What award did the writer of Never Let Me Go novel win in 1989?", the model tends to focus on the name of the writer at the first step, before jumping to the award description in the second step/hop." In the example of FIG. 10, for the question "What is the population according to the 2007 population census of the city in which the National Archives and Library of Ethiopia is located?" the model focuses on Addis Ababa at the first step, i.e., the name of the city where the National Archives and Library of Ethiopia are located and then jumps to the population of this city in the next hop.

Figure 11:
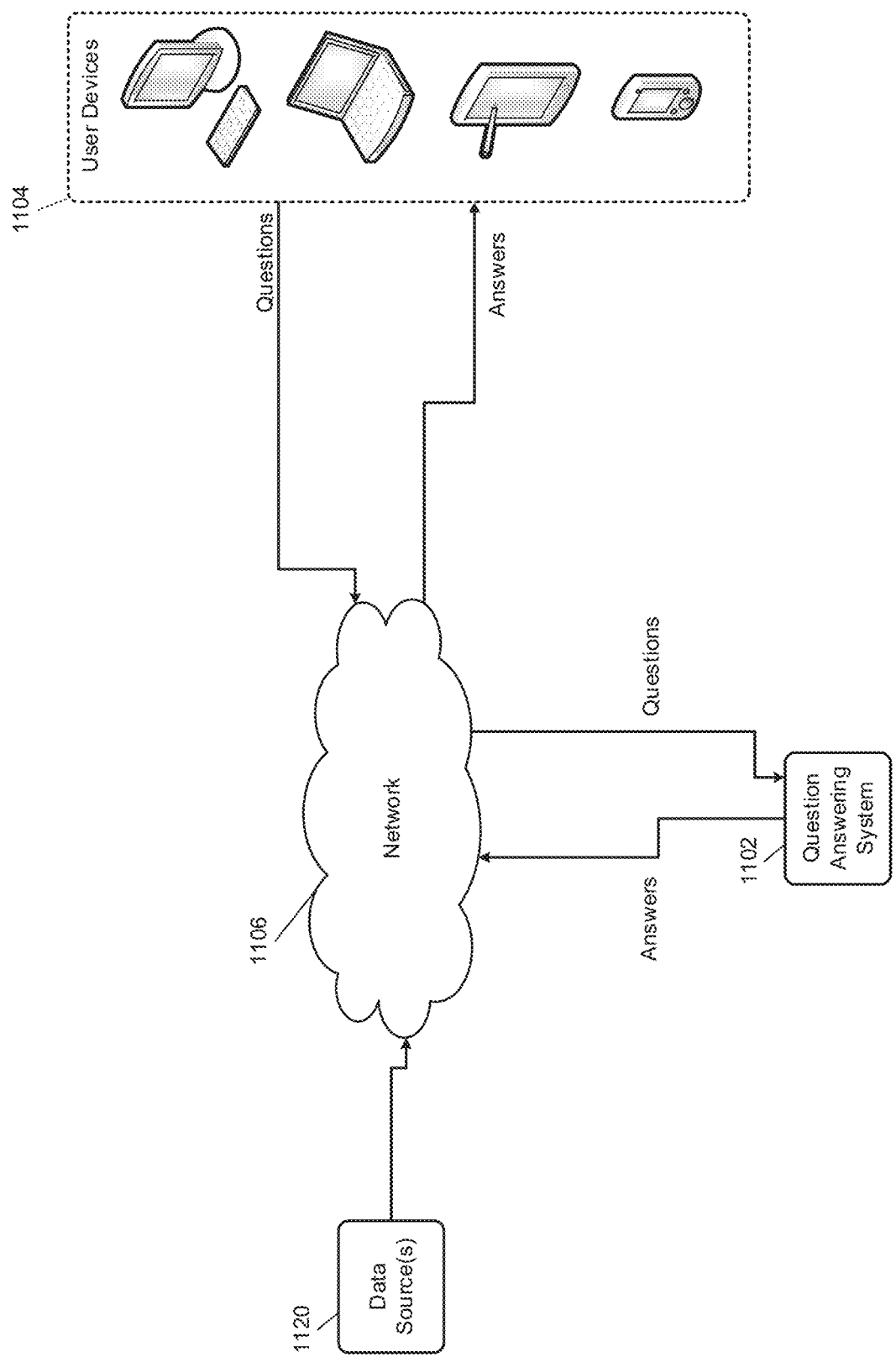
FIG. 11 is a functional block diagram of an example a question answering system.

FIG. 11 is a functional block diagram of an example a question answering system 1102 configured to answer questions in queries. The question answering system 1102 is configured to receive queries about one or more bodies of text (e.g., novels, news articles, documents, etc.) from one or more user computing device(s) 1104 via a network 1106. The bodies of text may be received with the queries and/or stored and retrieved based on the queries.

The question answering system 1102 reads the bodies of text and determines answers to the questions from the bodies of text, respectively. The question answering system 1102 may transmit the answers back to the computing devices 1104 that transmitted the questions, respectively.

The computing devices 1104 may display the answers to users. The computing devices 1104 may also display other information to the users. For example, the computing devices 1104 may display additional information related to the bodies of text, respectively, information relevant to the answers, respectively, etc. The question answering system 1102 and the computing devices 1104 communicate via the network 1106.

A plurality of different types of computing devices 1104 are illustrated in FIG. 11. The computing devices 1104 include any type of computing devices that is configured to generate and transmit questions regarding text to the question answering system 1102 via the network 1106. Examples of the computing devices 104 are provided above and include, but are not limited to, smart (cellular) phones, tablet computers, laptop computers, and desktop computers, as illustrated in FIG. 11. The computing devices 1104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The computing devices 1104 may use a variety of different operating systems. In an example where a computing device 1104 is a mobile device, the computing device 1104 may run an operating system including, but not limited to, Android, iOS developed by Apple Inc., or Windows Phone developed by Microsoft Corporation. In an example where a computing device 1104 is a laptop or desktop device, the computing device 1104 may run an operating system including, but not limited to, Microsoft Windows, Mac OS, or Linux. The computing devices 1104 may also access the question answering system 1102 while running operating systems other than those operating systems described above, whether presently available or developed in the future.

In some examples, a computing device 1104 may communicate with the question answering system 1102 using an application installed on the computing device 1104. In general, a computing device 1104 may communicate with the question answering system 1102 using any application that can transmit questions to the question answering system 1102 to be answered by the question answering system 1102. In some examples, a computing device 1104 may run an application that is dedicated to interfacing with the question answering system 1102, such as an application dedicated to question answering. In some examples, a computing device 1104 may communicate with the question answering system 1102 using a more general application, such as a web-browser application. The application executed by a computing device 1104 to communicate with the question answering system 1102 may display a search field on a graphical user interface (GUI) in which the user may enter questions. The user may enter a question using a touchscreen or physical keyboard, a speech-to-text program, or other form of user input.

A question may include words, numbers, letters, punctuation marks, and/or symbols. In general, a question may be a request for information retrieval (e.g., an answer) from the question answering system 1102. For example, a question may be directed to providing an answer from a specific body of text that is responsive to the question.

A computing device 1104 may receive an answer from the question answering system 1102 that is responsive to the question transmitted to the question answering system 1102. In various implementations, the computing device 1104 may receive and the question answering system 1102 may transmit more than one answer that is responsive to the question. In the example of the question answering system 1102 providing multiple answers, the question answering system 1102 may determine a confidence value (indicative of a likelihood of that the answer is correct) for each of the individual answers and provide the confidence values along with the answers to the computing device 1104. The computing device 1104 may display more than one of the multiple answers (e.g., all answers having a confidence value that is greater than a predetermined value), only the answer with the highest confidence value, etc.

The computing device 1104 may be running an application including a GUI that displays the answer(s) received from the question answering system 1102. The respective confidence value(s) may also be displayed. For example, the application used to transmit the question to the question answering system 1102 may also present (e.g., display or speak) the received answer(s) to the user. As described above, the application that presents the received answer(s) to the user may be dedicated to interfacing with the question answering system 1102 in some examples. In other examples, the application may be a more general application, such as a web-browser application.

The GUI of the application running on the computing device 1104 may display the answer(s) to the user in a variety of different ways, depending on what information is transmitted to the computing device 1104. In examples where the search results include a list of answers and associated confidence values, the question answering system 1102 may transmit the list of answers and respective confidence values to the computing device 1104. In this example, the GUI may display the answer(s) and the confidence value(s) to the user as a list of possible answers.

In some examples, the question answering system 1102, or other computing system, may transmit additional information to the computing device 1104 such as, but not limited to, applications and/or other information associated with the body of text, the question, or the answer, other bodies of text associated with the body of text, etc. This additional information may be stored in a data store and transmitted by the question answering system 1102 to the computing device 1104 in some examples. In examples where the user device 104 receives the additional information, the GUI may display the additional information along with the answer(s). In some examples, the GUI may display the answers as a list of applications ordered from the top of the screen to the bottom of the screen by descending conference value. In some examples, the answers may be displayed under the search field in which the user entered the question.

As stated above, the computing devices 1104 may transmit the body of text from which to generate the answer along with the question (for the body of text). Alternatively, the question answering system 1102 may obtain the body of text from a data source 1120. The data sources 1120 may include a variety of different text providers. The data sources 1120 may include digital distribution platforms such as, but are not limited to, online news sources, websites, websites that include web logs (i.e., blogs), social networking sites (e.g., Facebook, Twitter, etc.) and/or other types of data sources.

The computing devices 1104, the question answering system 1102, and the data sources 1120 may be in communication with one another via the network 1106. The network 1106 may include various types of networks, such as a wide area network (WAN) and/or the Internet. Although the network 1106 may represent a long range network (e.g., Internet or WAN), in some implementations, the network 1106 may include a shorter range network, such as a local area network (LAN). In one embodiment, the network 1106 uses standard communications technologies and/or protocols. Thus, the network 1106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 1106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 1106 can use custom and/or dedicated data communications technologies instead of, or in addition to, the ones described above.

Figure 12:
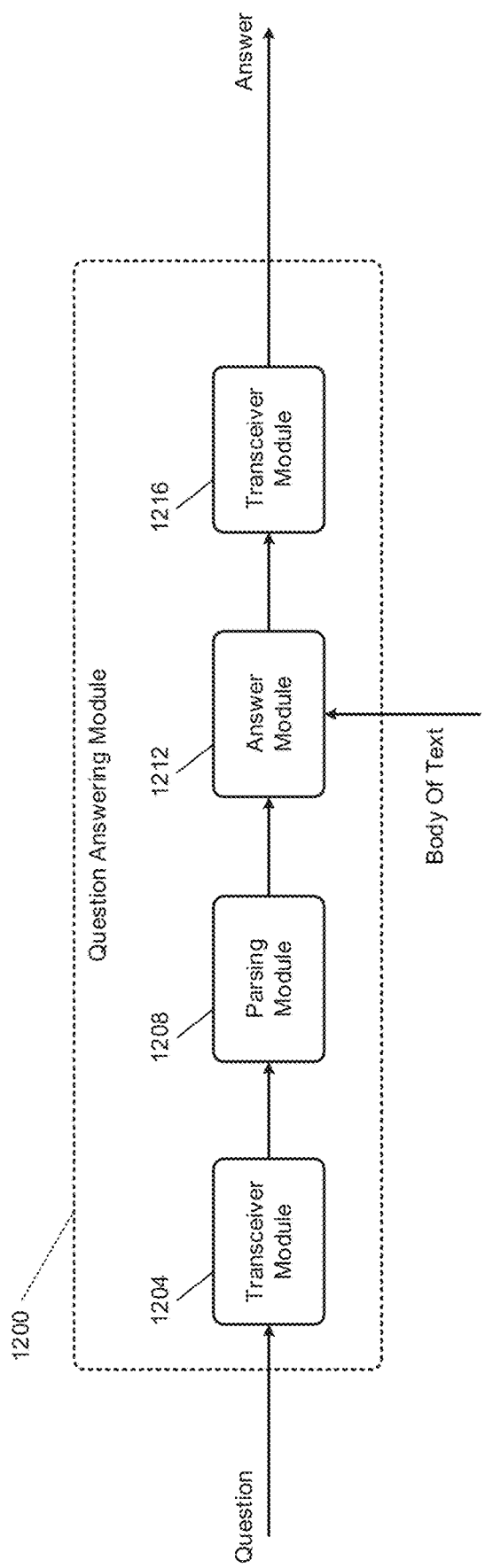
FIG. 12 is a functional block diagram including an example implementation of a question answering module.

FIG. 12 is a functional block diagram including an example implementation of a question answering module 1200 of the question answering system 1102. The question answering module 1200 may include the elements of FIGS. 1 and 5. A first transceiver module 1204 receives a query including a question from a computing device 1104. The transceiver module 1204 may also receive a body of text from the computing device 1104 or obtain the body of text in another manner.

A parsing module 1208 may parse the query to obtain the question that is to be answered from the body of text. In various implementations, the parsing module 1208 may perform speech to text conversion. The parsing module 1208 may, for example, identify a string of one or more words forming the question to be answered. The parsing module 1208 may also perform correct any misspelled words in the question and/or perform one or more other word processing functions on the question. The parsing module 128 may include the encoding, reading, and reformulation modules discussed above.

An answer module 1212 determines the answer to the question from the body of text, as described above. The answer module 1212 includes the multi-hop model described above. A second transceiver module 1216 transmits the determined answer to the question back to the computing device 1104. In various implementations, the second transceiver module 1216 may be omitted, and the first transceiver module 1204 may transmit the answer back to the computing device 1104 from which the question was received.

Figure 13:
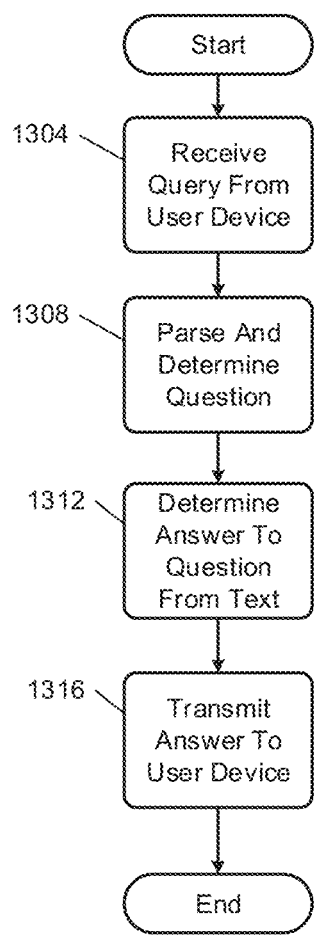
FIG. 13 includes a flowchart depicting an example method of receiving a question and providing an answer to the question.

FIG. 13 includes a flowchart depicting an example method of receiving a question and providing an answer to the question. The example of FIG. 13 may be performed by the question answering module 1200.

Control begins with 1304 where the question answering module 1200 receives a query from a computing device 1104. The query includes a question to be answered. The query may also include a body of text that is to be used as the basis for answering the question. At 1308, the question answering module 1200 parses the query and determines the question to be answered.

The question answering module 1200 determines the answer to the question from the body of text at 1312 using the multi hop model, as described above. The question answering module 1200 also obtains the body of text identified in the query if the body of text is not sent by the computing device 1104. Alternatively, a predetermined text source may be used (e.g., Wikipedia). At 1316, the question answering module 1200 transmits the answer to the question back to the computing device 1104.

FIG. 14 includes a functional block diagram of a training module 1400. The training module 1400 trains the multi hop model used by the question answering module 1200 to determine answers to received questions, respectively, as described above. The training module 1400 may train the multi hop model using a training dataset 1404, such as described above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A question answering system comprising:
a first encoder module configured to receive a question from a computing device via a network, the question including a first plurality of words, and to encode the question into a first vector representation;
a second encoder module configured to encode a document D into a second vector representation, the document including a second plurality of words;
a first reading module configured to generate a third vector representation based on the first and second vector representations;
a first reformulation module configured to generate a first reformulated vector representation for the question based on the first vector representation;
a second reading module configured to generate a fourth vector representation based on the second vector representation and the first reformulated vector representation;
a second reformulation module configured to generate a second reformulated vector representation for the question based on first reformulated vector representation;
an answer module configured to determine an answer to the question based on the second reformulated vector representation and to transmit the answer to the computing device via the network,
wherein the first reading module is configured to determine (a) first and (b) second sets of probabilities that represent (a) a probability of each word of the document being a beginning of an answer span and (b) a probability of each word of the document being an end of the answer span, respectively, the answer span being a span of words of the document that correctly answers the question; and
an extractive attention module configured to, based on the first and second sets of probabilities, determine an attention vector of probabilities of entries of the second vector representation being part of the answer span.

2. The question answering system of claim 1 wherein each of the first and second encoder modules is configured to execute one of word-level encoding, character-level encoding, and both word-level embedding and character-level encoding.

3. The question answering system of claim 1 wherein the first reformulation module is configured to generate the first reformulated vector representation further based on the second vector representation.

4. The question answering system of claim 1 wherein the second reformulation module is configured to generate the second reformulated vector representation further based on the second vector representation.

5. The question answering system of claim 1 wherein the answer module is configured to generate the answer further based on the second vector representation.

6. The question answering system of claim 1 further comprising a max pooling module configured to adjust a dimension of the first vector representation to a predetermined dimension.

7. The question answering system of claim 1 further comprising:
a third reading module configured to generate a fifth vector representation based on the second vector representation and the second reformulated vector representation; and
a third reformulation module configured to generate a third reformulated vector representation for the question based on second reformulated vector representation,
wherein the answer module is configured to determine the answer to the question based on the third reformulated vector representation.

8. The question answering system of claim 1 wherein the first reformulation module is configured to generate a weighted second vector representation by applying weighting entries of the second vector representation based on values in the attention vector and to determine the first reformulated vector representation based on the weighted second vector representation.

9. The question answering system of claim 8 further comprising a max pooling module configured to adjust a dimension of the first vector representation to a predetermined dimension,
wherein the first reformulation module is configured to adjust a dimension of the weighted second vector representation to the predetermined dimension.

10. The question answering system of claim 1 wherein the first reformulation module includes a bidirectional gated recurrent unit (BiGRU) and the second reformulation module includes a BiGRU.

11. The question answering system of claim 1 wherein the second encoder module is configured to generate the second vector representation based on a concatenation of word level encoding and character level encoding.

12. The question answering system of claim 1 wherein the answer module is further configured to determine a first probability of the answer being yes, a second probability of the answer being no, and a third probability of the answer being a span of the words of the second plurality of words of the document.

13. The question answering system of claim 12 wherein the answer module is configured to:
set the answer to yes when the first probability is greater than the second and third probabilities;
set the answer to no when the second probability is greater than the first and third probabilities; and
set the answer to the span of words when the third probability is greater than the first and second probabilities.

14. The question answering system of claim 1 further comprising the computing device,
wherein the computing device is configured to at least one of:
display the answer on a display; and
output the answer via at least one speaker.

15. The question answering system of claim 1 further comprising the computing device,
wherein the computing device is configured to receive the question via a microphone.

16. The question answering system of claim 1 wherein the answer module includes four bidirectional gated recurrent units and four fully connected layers.

17. A training system comprising:
a question answering system comprising:
a first encoder module configured to receive a question from a computing device via a network, the question including a first plurality of words, and to encode the question into a first vector representation;
a second encoder module configured to encode a document D into a second vector representation, the document including a second plurality of words;
a first reading module configured to generate a third vector representation based on the first and second vector representations;
a first reformulation module configured to generate a first reformulated vector representation for the question based on the first vector representation;
a second reading module configured to generate a fourth vector representation based on the second vector representation and the first reformulated vector representation;
a second reformulation module configured to generate a second reformulated vector representation for the question based on first reformulated vector representation; and
an answer module configured to determine an answer to the question based on the second reformulated vector representation and to transmit the answer to the computing device via the network; and
a training module configured to train the question answering system by minimizing a first loss regarding facts support answers to questions, a second loss regarding spans of words, and a third loss regarding classification of answers.

18. A question answering system comprising:
a means for receiving a question from a computing device via a network, the question including a first plurality of words, and to encode the question into a first vector representation;
a means for encoding a document D into a second vector representation, the document including a second plurality of words;
a means for generating a third vector representation based on the first and second vector representations;
a means for generating a first reformulated vector representation for the question based on the first vector representation;
a means for generating a fourth vector representation based on the second vector representation and the first reformulated vector representation;

a means for generating a second reformulated vector representation for the question based on first reformulated vector representation;

a means for determining an answer to the question based on the second reformulated vector representation and transmitting the answer to the computing device via the network, wherein the means for generating the third vector representation is for determining (a) first and (b) second sets of probabilities that represent (a) a probability of each word of the document being a beginning of an answer span and (b) a probability of each word of the document being an end of the answer span, respectively, the answer span being a span of words of the document that correctly answers the question; and a means for, based on the first and second sets of probabilities, determining an attention vector of probabilities of entries of the second vector representation being part of the answer span.

19. A question answering method comprising:

by one or more processors, receiving a question from a computing device via a network, the question including a first plurality of words, and to encode the question into a first vector representation;

by the one or more processors, encoding a document D into a second vector representation, the document including a second plurality of words;

by the one or more processors, generating a third vector representation based on the first and second vector representations;

by the one or more processors, generating a first reformulated vector representation for the question based on the first vector representation;

by the one or more processors, generating a fourth vector representation based on the second vector representation and the first reformulated vector representation;

by the one or more processors, generating a second reformulated vector representation for the question based on first reformulated vector representation;

by the one or more processors, determining an answer to the question based on the second reformulated vector representation; and by the one or more processors, transmitting the answer to the computing device via the network, by the one or more processors, determining (a) first and (b) second sets of probabilities that represent (a) a probability of each word of the document being a beginning of an answer span and (b) a probability of each word of the document being an end of the answer span, respectively, the answer span being a span of words of the document that correctly answers the question; and by the one or more processors, based on the first and second sets of probabilities, determining an attention vector of probabilities of entries of the second vector representation being part of the answer span.

20. A system for answering a question using a document, comprising:

(A) a plurality of components of sequential hops, wherein a first component hop is coupled in sequence with a second component hop, and wherein:
 (a) the first component hop comprises a first reading module coupled to a first reformulation module,
  (i) the first reading module configured to receive the question and the document and to output to the first reformulation module a first question-aware representation of the document; and
  (ii) the first reformation module configured to extract elements from the first question-aware representation of the document and to compute a first updated representation of the question; and
 (b) the second component hop comprises a second reading module coupled to a second reformulation module,
  (i) the second reading module configured to receive the first updated representation of the question and the document and to output to the second reformulation module a second question-aware representation of the document; and
  (ii) the second reformulation module configured to extract elements from the second question-aware representation of the document and to compute a second updated representation of the question;

(B) a plurality of parallel heads, each of the plurality of parallel heads including an independent instance of (A) the plurality of components of sequential hops;

(C) an answering module configured to:
 receive updated representations of the document output by the plurality of parallel heads, respectively; and
 based on the updated representations of the document, determine an answer to the question and facts in the document that support the answer to the question, wherein the first reading module is configured to determine (a) first and (b) second sets of probabilities that represent (a) a probability of each word of the document being a beginning of an answer span and (b) a probability of each word of the document being an end of the answer span, respectively, the answer span being a span of words of the document that correctly answers the question; and (D) an extractive attention module configured to, based on the first and second sets of probabilities, determine an attention vector of probabilities of entries of the second question-aware representation being part of the answer span.

* * * * *